United States Patent
Tsuji

(10) Patent No.: US 10,684,880 B2
(45) Date of Patent: Jun. 16, 2020

(54) ALLOCATING AND INITIALIZING I/O DEVICES AT VIRTUAL

(71) Applicant: NEC CORPORATION, Tokyo (JP)

(72) Inventor: Akira Tsuji, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/770,045

(22) PCT Filed: Oct. 17, 2016

(86) PCT No.: PCT/JP2016/004595
§ 371 (c)(1),
(2) Date: Apr. 20, 2018

(87) PCT Pub. No.: WO2017/068770
PCT Pub. Date: Apr. 27, 2017

(65) Prior Publication Data
US 2018/0321964 A1    Nov. 8, 2018

(30) Foreign Application Priority Data

Oct. 22, 2015  (JP) ................. 2015-208114

(51) Int. Cl.
*G06F 9/455* (2018.01)
*G06F 9/4401* (2018.01)
*G06F 9/50* (2006.01)

(52) U.S. Cl.
CPC ........ *G06F 9/45558* (2013.01); *G06F 9/4401* (2013.01); *G06F 9/4411* (2013.01);
(Continued)

(58) Field of Classification Search
CPC .. G06F 9/45558; G06F 9/4411; G06F 9/5027; G06F 9/4401; G06F 2009/45579; G06F 2009/45591; G06F 2009/45575
See application file for complete search history.

(56) References Cited

U.S. PATENT DOCUMENTS 7,467,381 B2 * 12/2008 Madukkarumukumana ................
G06F 9/5077
710/200
2008/0307213 A1 * 12/2008 Sekiguchi ........... G06F 9/45558
713/1
(Continued)

FOREIGN PATENT DOCUMENTS

JP    9-274598 A    10/1997
JP    2008-146566 A    6/2008
(Continued)

OTHER PUBLICATIONS

"ExpEther Products," [online], ExpEther Consortium, 2015, retrieved from the Internet: <URL: http://www.expeter.org/eproduct.html>, [retrieved on Oct. 13, 2015].
(Continued)

*Primary Examiner* — Benjamin C Wu
(74) *Attorney, Agent, or Firm* — Sughrue Mion, PLLC

(57) ABSTRACT

The purpose of the present invention is to provide a computer which is capable of increasing the number of I/O devices which connect to a PCI fabric which has predetermined specifications. This computer comprises: a storage unit which retains an I/O device list which is used to manage the allocation to a virtual machine which runs on the computer of an I/O device which is connected to the computer via a network; a virtual machine monitor which identifies the I/O device which is required for the operation of the virtual machine; and an I/O device manager which refers to the I/O device list and assesses whether the I/O device which has been identified by the virtual machine monitor is available to be allocated to the virtual machine, and if there is an I/O device available to be allocated to the virtual machine, allocates the I/O device to the virtual machine, and registers in the storage unit an identifier which is assigned to the I/O device on the basis of predetermined specifications, together with an identifier of the virtual machine.

4 Claims, 26 Drawing Sheets

(52) U.S. Cl.
CPC .. *G06F 9/5027* (2013.01); *G06F 2009/45575* (2013.01); *G06F 2009/45579* (2013.01); *G06F 2009/45591* (2013.01)

(56) References Cited

U.S. PATENT DOCUMENTS

| | | | | |
|---|---|---|---|---|
| 2013/0159997 | A1* | 6/2013 | Cawlfield | G06F 9/45558 718/1 |
| 2014/0006573 | A1* | 1/2014 | Goto | H04L 63/164 709/221 |
| 2014/0136809 | A1* | 5/2014 | Engle | G06F 3/067 711/170 |
| 2016/0197880 | A1* | 7/2016 | Korman | H04L 41/12 709/226 |
| 2018/0046509 | A1* | 2/2018 | Arata | G06F 9/5072 |

FOREIGN PATENT DOCUMENTS

| | | |
|---|---|---|
| JP | 2010-218539 A | 9/2010 |
| JP | 2012-160095 A | 8/2012 |

OTHER PUBLICATIONS

MAGMA, "MAGMA ExpresBox3200," [online], retrieved from the Internet: <URL:http://magma.com/back-office/wp-content/uploads/2015/03/EB3200-Datasheet.pdf>, [retrieved on Oct. 13, 2015].
International Search Report for PCT/JP2016/004595 dated Dec. 6, 2016.

* cited by examiner

Fig. 3

| STARTING ADDRESS | ENDING ADDRESS | PHYSICAL BDF NUMBER | BAR NUMBER |
|---|---|---|---|
| 0x1000 | 0x1FFF | 00:01.0 | 0 |
| 0x2000 | 0x2FFF | 00:01.0 | 1 |
| 0x3000 | 0x3FFF | 00:02.0 | 0 |

| VIRTUAL BDF NUMBER | PHYSICAL BDF NUMBER |
|---|---|
| 00:08:0 | 00:01:0 |
| 00:0a:0 | 00:02:0 |
| 00:10:0 | 00:03:0 |

| DEVICE TYPE | SPECIFICATION | MAC ADDRESS | ALLOCATION DESTINATION VM ID |
|---|---|---|---|
| NIC | Rate=10Gbps | 00:11:22:33:44:55 | 0 |
| GPU | GPU clock=1GHz, Mem=2GB | 66:77:88:99:aa:bb | UNALLOCATED |
| SSD | CAPACITY = 256GB | cc:dd:ee:ff:00:11 | 1 |

| MAC ADDRESS | VM ID |
|---|---|
| 00:11:22:33:44:55 | 0 |
| 66:77:88:99:aa:bb | 1 |
| cc:dd:ee:ff:00:11 | 2 |

| BDF NUMBER |
|---|
| 00:08:0 |
| 00:0a:0 |
| 00:10:0 |

| DEVICE TYPE | SPECIFICATION | MAC ADDRESS | ALLOCATION DESTINATION VMM ID | ALLOCATION DESTINATION VM ID |
|---|---|---|---|---|
| NIC | Rate=10Gbps | 00:11:22:33:44:55 | 0 | 0 |
| GPU | GPU clock=1GHz, Mem=2GB | 66:77:88:99:aa:bb | UNALLOCATED | UNALLOCATED |
| SSD | CAPACITY = 256GB | cc:dd:ee:ff:00:11 | 2 | 1 |

57 ies through a network, a number of the I/O devices not
ALLOCATING AND INITIALIZING I/O DEVICES AT VIRTUAL

TECHNICAL FIELD

The present invention relates to a technology of managing an I/O fabric of a computer. The present invention particularly relates to a computer, a device allocation management method, and a program recording medium that connect I/O devbeing accommodated by an enclosure of the computer.

BACKGROUND ART

A server virtualization technology has enabled use of a computer as a plurality of computers by operating a plurality of independent operating systems (OS) on the computer as virtual machines (VM). Increase in a number of central processing unit (CPU) cores and a memory size that are equipped on a server increases a number of virtual machines operating on the server, and in some cases, may enable over 100 virtual machines to operate on a server.

Such a server virtualization technology provides each virtual machine with virtual hardware, that is, a virtual CPU, a virtual memory, a virtual disk device, a virtual I/O device, and the like, and each virtual machine uses the virtual hardware as real hardware.

Accordingly, when each virtual machine uses the virtual hardware, a management program called a hypervisor or a virtual machine monitor (VMM), the program being a main component of the server virtualization technology, traps an access to hardware by the virtual machine and performs a suitable access to a resource in real hardware. Accordingly, when a virtual machine performs some type of processing, overhead by the virtual machine monitor is added, and therefore performance of a virtual machine is generally lower than that of an OS operating on real hardware.

In order to avoid overhead, technologies of directly allocating a real hardware resource to a virtual machine are proposed and implemented. One of the technologies is peripheral component interconnect (PCI) pass-through. The PCI pass-through enables a specific virtual machine to directly access an I/O device connected to a PCI bus or a PCI-Express fabric, and enables reduction of overhead by the virtual machine monitor. The PCI pass-through technology will be described below, and it is assumed in the present description that an I/O device refers to an endpoint in PCI-Express.

However, in the PCI pass-through, there is a problem that a target I/O device is occupied by a specific virtual machine and therefore cannot be used by another virtual machine. Consequently, a technology of making an I/O device directly accessible from a plurality of virtual machines is proposed. The technology is single root-I/O virtualization (SR-IOV). An I/O device compatible with the SR-IOV includes a plurality of host interfaces and enables sharing of a single I/O device by a plurality of virtual machines by allocating each host interface to a virtual machine. The SR-IOV is often employed in an Ethernet (registered trademark) network interface controller (NIC) and is rarely employed in I/O devices other than a NIC, such as a disk controller and a graphics card.

The PCI pass-through and the SR-IOV (the technologies are hereinafter collectively referred to as "pass-through technologies") have not only an advantage in performance but also a functional advantage that a function included in I/O device hardware can also be used by a virtual machine. Virtual hardware normally used by a virtual machine often simulates older generation hardware and generally only has a simple function. For example, a transmission control protocol (TCP) offloading function included in a high-end Ethernet (registered trademark) NIC cannot be used. The PCI pass-through technology allocates an I/O device directly to a virtual machine, and therefore such an offloading function becomes available to the virtual machine.

By use of FIG. 24, initialization of a PCI-Express fabric will be described. FIG. 24 is a diagram illustrating an example of a PCI-Express fabric.

As illustrated in FIG. 24, a PCI-Express fabric 200 has a configuration including a PCI-Express root complex 201, PCI-Express endpoints 202 to 207, and PCI-Express switches 208 and 209 that are connected through PCI-Express links 210 to 217, with the PCI-Express root complex 201 as a root of the fabric.

The PCI-Express root complex, the PCI-Express endpoint, and the PCI-Express switch are collectively referred to as PCI-Express devices, in the present description. Although an initialization method described below is a method performed by a common personal computer (PC) and a general-purpose OS such as Linux (registered trademark), another initialization method may be employed.

First, when a PC is turned on, a basic input/output system (BIOS) or an OS searches the PCI-Express fabric 200. The search is performed for detecting and setting every PCI-Express device in the PCI-Express fabric 200. PCI-Express identifies a PCI-Express device by three numbers (a bus number [0 to 255], a device number [0 to 31], and a function number [0 to 7]) called bus-device-function (BDF). The function number is a number used for identifying each function when the same PCI-Express device has a plurality of functions.

The PCI-Express root complex 201, and the PCI-Express switches 208 and 209 will be described.

FIG. 25 is a simplified block diagram illustrating an internal configuration of the PCI-Express root complex 201.

Referring to FIG. 25, the PCI-Express root complex 201 includes a PCI compatible host bridge device, PCI-PCI bridges (root PCI-Express ports), and a root complex register block (optional).

In order to connect the components, the PCI-Express root complex internally consumes one bus number. Since the PCI-Express root complex is a device located at a root of the PCI-Express fabric, the bus number to be consumed is "0."

FIG. 26 is a simplified block diagram illustrating an internal configuration of the PCI-Express switches 208 and 209.

Referring to FIG. 26, each of the PCI-Express switches 208 and 209 includes a PCI-PCI bridge (upstream PCI-Express port) and a PCI-PCI bridges (downstream PCI-Express ports). In order to connect the components, each of the PCI-Express switches 208 and 209 internally consumes one bus number. The upstream refers to a direction getting closer to the PCI-Express root complex 201 side on the PCI-Express fabric. The downstream refers to a direction moving away from the PCI-Express root complex 201 on the PCI-Express fabric. Although FIG. 26 illustrates a case of two downstream ports, there may be three downstream ports.

In PCI-Express, a connection between PCI-Express devices is a point-to-point connection by a switch rather than a bus connection, and therefore only one PCI-Express endpoint or a PCI-Express switch is connected to a PCI-to-PCI bridge on the PCI-Express root complex 201 or each PCI-PCI bridge (downstream PCI-Express port) on the PCI- Express switches 208 and 209, and different bus numbers are allocated to the respective links.

At a search, the search is performed from the bus number 0. An initialization program such as a BIOS or an OS performs processing of reading a vendor identification (ID) of a PCI-Express device on each device number with the bus number 0. The vendor ID is saved in a register group called a PCI configuration space in a PCI-Express device. The value not being 0xFFFF (0x is a prefix denoting a hexadecimal number) indicates that some PCI-Express device is connected.

Next, when connection of some PCI-Express device is detected (the PCI-Express endpoints 202 and 203, and the PCI-Express switch 208 in FIG. 24), the initialization program executes reading of a class code on the PCI-Express device. The class code is also saved in the PCI configuration space. The class code tells a type of a PCI-Express device such as whether the device is a device for image output. The class code indicating a device connecting links with different bus numbers, such as a PCI-Express switch, tells a possibility of another PCI-Express device existing downstream of the bus number currently in the search.

Next, when a detected PCI-Express device is a PCI-Express endpoint (the PCI-Express endpoints 202 and 203 in FIG. 24), the initialization program allocates an I/O area and a memory area to the PCI-Express endpoint. The allocation is provided by setting of a base address register (BAR) included in a PCI configuration space in the PCI-Express device.

There are a maximum of six BARs from 0 to 5 included in a PCI-Express endpoint, and a BAR holds information about an I/O area and a memory area, the information being required by the PCI-Express endpoint. The initialization program writes 0xFFFFFFFF into the BAR 0 and reads a value of the BAR 0. Then, depending on the read value, which of an I/O area and a memory area is requested, what area size is required, and the like become clear. In accordance with the request, the initialization program writes a base address into the BAR 0. A range from the base address to a value obtained by adding the size requested by the PCI-Express endpoint to the base address is an I/O area or a memory area allocated to the PCI-Express endpoint. The BAR setting is set in such a way that there is no overlap between PCI-Express endpoints. The initialization program performs similar processing on the BARs 1 to 5. Additionally, the initialization program also performs setting of a command register, a cache line size register, and a latency timer register in the PCI configuration space.

Next, when a detected PCI-Express device is a bridge device such as a PCI-Express root complex and a PCI-Express switch (the PCI-Express switch 208 in FIG. 24), the initialization program first performs setting of a BAR similarly to the PCI-Express endpoint. In the case of a bridge device, there are a maximum of two BARs from 0 to 1.

Then, the initialization program performs setting of a command register, a cache line size register, and a latency timer register in a PCI configuration space in the bridge device. Additionally, the initialization program performs setting of a primary bus number register, a secondary bus number register, and a subordinate bus number register. The primary bus number refers to a number of a bus existing on the upstream side of the local bridge device, and the secondary bus number refers to a number of a bus existing on the downstream side of the local bridge device. The subordinate bus number indicates a bus number of a link with a maximum bus number, out of links existing downstream of the local bridge device. Since detection of every device is not completed at this point, 0xFF being the maximum value is set to the subordinate number.

Then, the initialization program performs setting of a memory base address register and an I/O base address register. The memory base address register indicates a starting address of a memory space allocated to the secondary bus side, and the I/O base address register indicates a starting address of an I/O space allocated to the secondary bus side.

Subsequently, the initialization program performs a search for a PCI-Express device connected downstream of the device. The search of the downstream side is recursively performed, and when the search is completed, final subordinate bus numbers are determined in order of the PCI-Express switches 209 and 208. Further, values of a memory limit address and an I/O limit address are determined, and the values are stored in a suitable location in a PCI configuration register. The memory limit address is a size of a memory space allocated to the secondary bus side, and the I/O limit address is a size of an I/O space allocated to the secondary bus side. When recursively searching the downstream side, the initialization program is able to calculate sizes of a memory space and an I/O space allocated to each link by holding a set value of a BAR set to a device existing in each link. Thus, values of a memory limit address and an I/O limit address in a bridge device on the upstream side are obtained.

Thus, the initialization program completes the setting of the PCI-Express fabric. In the PCI-Express fabric 200 illustrated in FIG. 24, the initialization program first performs setting of the PCI-Express root complex 201. Next, the initialization program performs setting of the PCI-Express endpoint 202, the PCI-Express endpoint 203, the PCI-Express switch 208, the PCI-Express endpoint 204, the PCI-Express switch 209, the PCI-Express endpoint 206, the PCI-Express endpoint 207, and the PCI-Express switch 209 in this order. In the last setting performed on the PCI-Express switch 209, an I/O limit address, a memory limit address, and a subordinate number are set. Next, the initialization program performs setting of the PCI-Express endpoint 205 and the PCI-Express switch 208 in this order. In the setting of the PCI-Express switch 208, an I/O limit address, a memory limit address, and a subordinate number are set. Subsequently, the initialization program sets an I/O limit address, a memory limit address, and a subordinate number with respect to the PCI-Express root complex 201.

In the case of PCI-Express, when an initialization program accesses a PCI configuration space in a PCI-Express device, the initialization program issues a configuration read request or a configuration write request. A BDF number is written into each of the requests as information for identifying a destination device. The PCI-Express device side holds a destination BDF number included in a configuration write request as a BDF number of the local device.

The BDF number is written into a request as information indicating a source PCI-Express device when a request such as a memory read request and a memory write request is issued from the PCI-Express device side.

It is anticipated that, in the future, when a number of virtual machines operating on a server gradually increases, and one or more I/O devices are to be allocated to each virtual machine by the PCI pass-through or the SR-IOV, a required number of I/O devices may not be provided in an enclosure of a server or a PC. Although five or six I/O devices may be generally equipped in a 2U server (a thickness of the enclosure being 8.89 cm), the number of I/O devices that can be equipped is overly small compared with a number of virtual machines.

In view of the situation described above, a technology of making I/O devices connectable to a PC or a server, a number of the I/O devices being more than a number of previously provided PCI-Express slots, has been developed. Specifically, by extending a PCI-Express fabric previously existing only inside an enclosure of a server or a PC to outside the enclosure and connecting an I/O box equipped with I/O devices to the PC or the server with a cable and a switch, the technology makes I/O devices connectable, a number of the I/O devices being more than a number of PCI-Express slots. Products based on such a technology are disclosed in NPLs 1 and 2.

A technology disclosed in NPL 1 extends a PCI-Express fabric to outside an enclosure by an I/O card simulating an upstream-side function of a PCI-Express switch, an I/O extension box simulating a downstream-side function, and Ethernet (registered trademark) connecting the components. A technology disclosed in NPL 2 extends a PCI-Express fabric to outside an enclosure by an I/O card and a cable that extend a PCI-Express signal.

CITATION LIST

Non Patent Literature

NPL 1: "ExpEther Products," [online], ExpEther Consortium, 2015, retrieved from the Internet: <URL: http://www.expether.org/eproduct.html>, [retrieved on Oct. 13, 2015]

NPL 2: MAGMA, "MAGMA ExpresBox3200," [online], retrieved from the Internet: <URL:http://magma.com/back-office/wp-content/uploads/2015/03/EB3200-Datasheet.pdf>, [retrieved on Oct. 13, 2015]

SUMMARY OF INVENTION

Technical Problem

The following analysis is given by the present invention. The technologies disclosed in NPLs 1 and 2 have a problem that a required number of I/O devices may not be allocated to a virtual machine using a pass-through technology. The reason will be described below.

An I/O device is identified by a BDF number in a PCI-Express fabric. Further, a unique BDF number is assigned to a bridge device connecting PCI-Express links having different bus numbers. A function number is a number for distinguishing functions when the same PCI-Express device has a plurality of functions. Accordingly, a unit of an I/O device is identified by a bus number (B) and a device number (D) in a BDF number.

Values that can be taken as a BDF number is defined by the PCI-Express specification; a bus number may take 256 values from 0 to 255, and a device number may take 32 values from 0 to 31. Accordingly, a PCI-Express fabric is able to accommodate a maximum of 256*32=8192 PCI-Express devices.

However, assuming that 1000 virtual machines are operating on a server, and ten I/O devices are allocated to each virtual machine by a pass-through technology, I/O devices a number of which is more than a number of devices that can be accommodated by a PCI-Express fabric are required, and such a system cannot be configured unless the I/O devices are compatible with the SR-IOV.

The technologies disclosed in NPLs 1 and 2 are technologies of increasing a number of I/O devices that can be equipped on a server or a PC, and are not technologies of increasing a number of I/O devices that are connectable to a PCI-Express fabric. Accordingly, the technologies are not able to solve the aforementioned problem. The same problem may arise in any PCI fabric in which a number of connected I/O devices is restricted by a predetermined specification, without being limited to the PCI-Express fabric.

The present invention is originated in view of the problem described above, and aims to provide a computer, a device allocation management method, and a program recording medium recording a program to be executed by a computer that enable increase in a number of I/O devices connected to a PCI fabric a specification of which is predetermined.

Solution to Problem

A computer according to the present invention to achieve the above aim has a composition which includes:

a storage unit that stores an I/O device list for managing allocation of an I/O device to a virtual machine operating on the computer, the I/O device being connected to the computer through a network;

a virtual machine monitor that specifies an I/O device required for operation of the virtual machine; and an I/O device manager that determines whether or not an I/O device specified by the virtual machine monitor is allocable to the virtual machine, by referring to the I/O device list, and when an I/O device allocable to the virtual machine exists, allocates the I/O device to the virtual machine and, along with an identifier of the virtual machine, stores, in the storage unit, an identifier assigned to the I/O device in accordance with a predetermined specification.

A device allocation management method according to the present invention is a device allocation management method by a computer which includes:

storing an I/O device list for managing allocation of an I/O device to a virtual machine operating on the computer, the I/O device being connected to the computer through a network;

specifying an I/O device required for operation of the virtual machine; and determining whether or not an I/O device specified by the virtual machine monitor is allocable to the virtual machine, by referring to the I/O device list, and when an I/O device allocable to the virtual machine exists, allocating the I/O device to the virtual machine and, along with an identifier of the virtual machine, storing, in the storage unit, an identifier assigned to the I/O device in accordance with a predetermined specification.

A program storage medium according to the present invention storing a program that causes a computer to execute:

a procedure of storing an I/O device list for managing allocation of an I/O device to a virtual machine operating on the computer, the I/O device being connected to the computer through a network;

a procedure of specifying an I/O device required for operation of the virtual machine; and a procedure of determining whether or not an I/O device specified by the virtual machine monitor is allocable to the virtual machine, by referring to the I/O device list, and when an I/O device allocable to the virtual machine exists, allocating the I/O device to the virtual machine and, along with an identifier of the virtual machine, storing, in the storage unit, an identifier assigned to the I/O device in accordance with a predetermined specification.

Advantageous Effects of Invention

The present invention is able to increase a number of connectable I/O devices without being restricted by a specification predetermined for a PCI fabric.

BRIEF DESCRIPTION OF DRAWINGS

FIG. 3 is a diagram illustrating a structure example of an address range table according to the first example embodiment of the present invention.

FIG. 4 is a diagram illustrating a structure example of a BDF number correspondence table according to the first example embodiment of the present invention.

FIG. 8 is a diagram illustrating a structure example of an I/O device list according to the first example embodiment of the present invention.

FIG. 9 is a diagram illustrating a structure example of a MAC address reverse lookup table according to the first example embodiment of the present invention.

FIG. 14 is a diagram illustrating a structure example of a BDF number table according to the second example embodiment of the present invention.

FIG. 22 is a diagram illustrating a structure example of an I/O device list according to the fourth example embodiment of the present invention.

DESCRIPTION OF EMBODIMENTS

Example embodiments of the present invention will be described with reference to drawings. Drawings and reference signs added to the description are given to respective components for convenience, as examples for facilitating understanding, and are not intended to limit the present invention to the illustrated aspects.

First Example Embodiment

Description of Configuration

Figure 1:
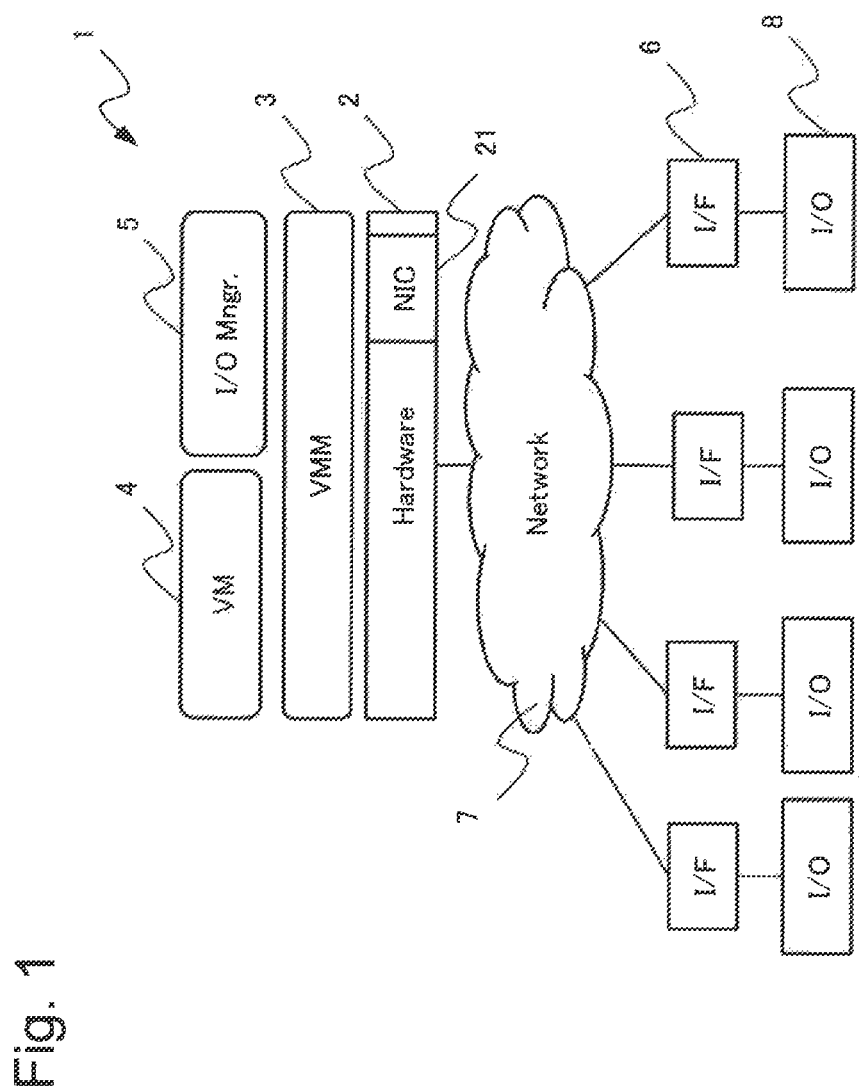
FIG. 1 is a block diagram illustrating a configuration example of a computer system according to a first example embodiment of the present invention.

FIG. 1 is a block diagram illustrating a configuration example of a computer system according to a first example embodiment of the present invention. Referring to FIG. 1, a computer system 1 includes hardware 2, a virtual machine monitor 3, a virtual machine 4, an I/O device manager 5, an I/O side network interface 6, a network 7, and an I/O device 8.

Although it is assumed in the description that the I/O device 8 is a PCI-Express endpoint, and the network 7 is Ethernet (registered trademark), according to the present example embodiment, the assumption does not intend to limit the present invention to include the aforementioned components as essential components.

The hardware 2 is configured to include basic components (unillustrated) constituting the computer, the components being a CPU, a memory, a disk device, and a network interface card (NIC) 21. FIG. 1 illustrates that the virtual machine 4, the I/O device manager 5, and the virtual machine monitor 3 are virtually configured by the CPU executing a program on the hardware 2.

The virtual machine monitor 3 has a function of providing the virtual machine 4 with virtual hardware and allocating a resource in the hardware 2 when the virtual machine 4 uses the virtual hardware. In a server virtualization environment, a method of providing the virtual machine monitor 3 as software operating on a general-purpose OS such as Linux (registered trademark) and a method of providing the virtual machine monitor 3 as dedicated software also having a function of an OS operating on the computer exist. Examples of the former include a kernel-based virtual machine (KVM), and examples of the latter include a XenServer and VMware. Although the description below is based on the former configuration, the present invention is not intended to be limited to a server virtualization environment with such a configuration.

The virtual machine 4 is a virtual computer environment operating under control of the virtual machine monitor 3. By installing an OS on virtual hardware provided by the virtual machine monitor 3, the OS may be used as an OS operating on a real computer environment.

When the virtual machine 4 uses a resource on the virtual computer environment, control by the virtual machine monitor 3 is involved. For example, when an application running on the virtual machine 4 accesses a memory, conversion from a virtual address (guest virtual address) to a physical address (guest physical address) is first performed in the virtual machine 4, and then the virtual machine monitor 3 detects a memory access using the guest physical address by the virtual machine 4 and converts the guest physical address into a virtual address (host virtual address) of the virtual machine monitor or a physical address (host physical address). When the guest physical address is converted into a host virtual address, the resulting address is further converted into a host physical address. The virtual machine 4 is able to perform a memory access through such conversions.

The I/O device manager 5 is a module managing the I/O device 8. The I/O device 8 is connected to the I/O device manager 5 through the I/O side network interface 6, the network 7, and the NIC 21.

The I/O device manager 5 controls initialization of the I/O device 8 and a data transfer request with the I/O device 8.

The initialization of the I/O device 8 refers to setting a value to a register in a PCI configuration space, such as a BAR included in the I/O device 8.

In the case of PCI-Express, data transfer requests between the I/O device manager 5 and the I/O device 8 include types being a memory read/write request, an I/O read/write request, a message request, and a completion. Each type has a unique format. The memory read/write request means a memory read request and a memory write request. The I/O read/write request means an I/O read request and an I/O write request.

In response to a request, the I/O device manager 5 generates a packet (transaction layer protocol [TLP] packet) conforming to each format, encapsulates the TLP packet into an Ethernet frame, and transmits the encapsulating frame. The I/O device manager 5 extracts a TLP packet from an Ethernet frame received from the I/O device 8 and notifies a content of the TLP packet to the virtual machine monitor 3.

Although the I/O device manager 5 is illustrated as a component separate from the virtual machine monitor 3 in FIG. 1, the I/O device manager 5 may be configured to be included in the virtual machine monitor 3.

The I/O side network interface 6 is an interface for connecting the I/O device 8 to the network 7. The I/O side network interface 6 is provided for each I/O device 8. Since Ethernet (registered trademark) is assumed as the network 7 according to the present example embodiment, the I/O side network interface 6 has a unique media access control (MAC) address.

The I/O side network interface 6 has a function of extracting a TLP packet from an Ethernet frame transmitted from the I/O device manager 5. Further, the I/O side network interface 6 has a function of encapsulating a TLP packet from the I/O device 8 by an Ethernet frame and transmitting the frame to the I/O device manager 5.

The I/O side network interface 6 has a function of holding a MAC address of the NIC 21 in order to enable the I/O device 8 to transmit a TLP packet. Additionally, the I/O side network interface 6 may reset (initialize) the connected I/O device 8 in response to a request from the I/O device manager 5 side.

The network 7 is a general-purpose computer network and is Ethernet (registered trademark), according to the present example embodiment. The network 7 is composed of a cable and a switch.

The network 7 connects the NIC 21 and the I/O side network interface 6.

The I/O device 8 is originally an I/O device connected to an expansion bus of a computer and corresponds to a PCI-Express endpoint, according to the present example embodiment. Examples of the I/O device 8 include a NIC, a graphics processing unit (GPU) card, a redundant arrays of independent disks (RAID) controller, and a sound card.

When initialized by the I/O device manager 5, the I/O device 8 is notified of a BDF number. The I/O device 8 is identified by a set composed of an identifier of the I/O side network interface 6 and a BDF number.

The identifier of the I/O side network interface 6 according to the present example embodiment is a MAC address. When the network 7 is a network other than Ethernet (registered trademark), the I/O side network interface 6 is configured to be a network interface compatible with the network, and an identifier defined in the network is set as an identifier of the I/O side network interface 6. For example, when the network 7 is InfiniBand, the I/O side network interface 6 is configured to be a network interface compatible with the InfiniBand protocol and has an identifier called a globally unique identifier (GUID).

Next, a configuration of the virtual machine monitor 3 illustrated in FIG. 1 will be described.

Figure 2:
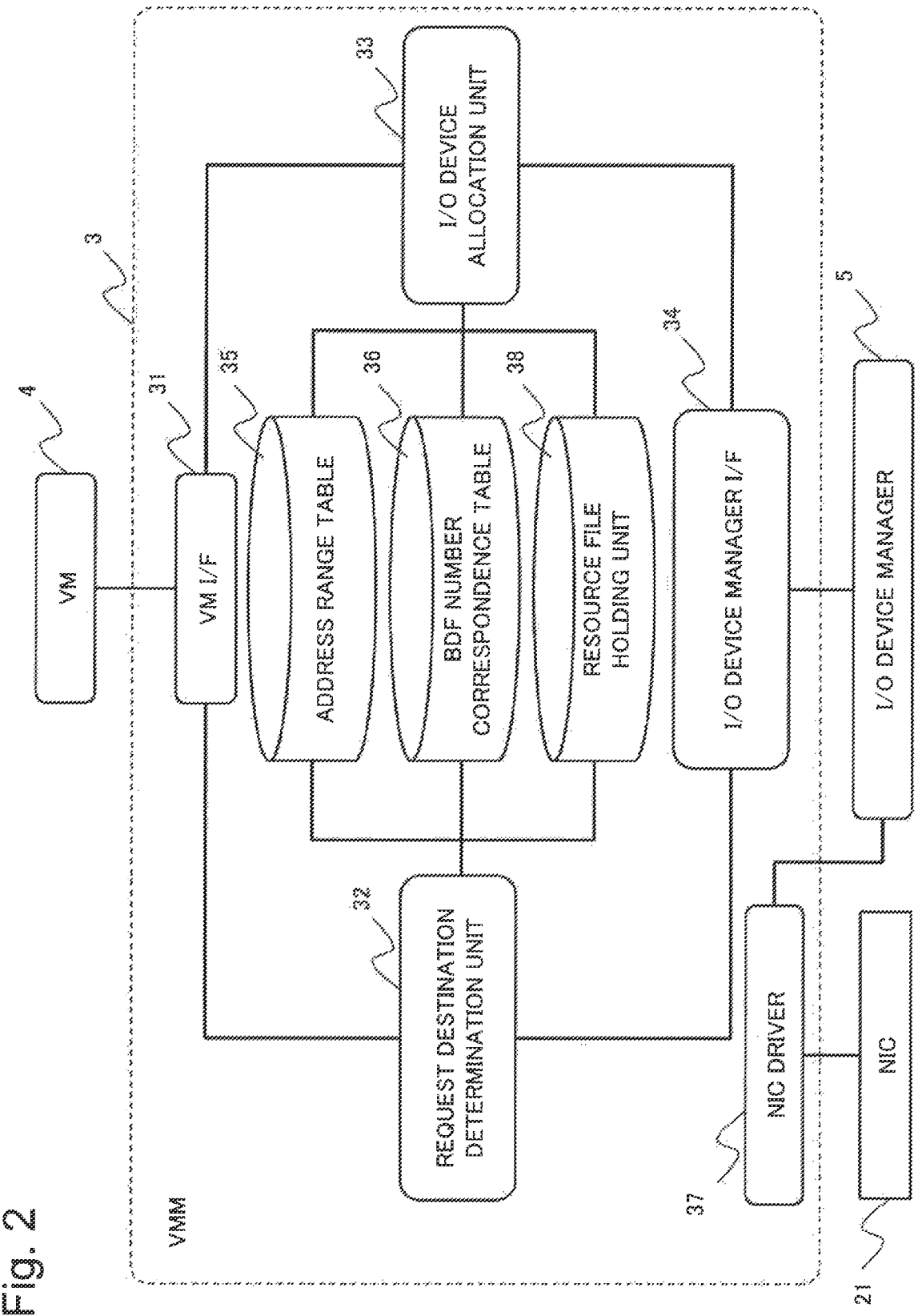
FIG. 2 is a block diagram illustrating a configuration example of a virtual machine monitor according to the first example embodiment of the present invention.

FIG. 2 is a block diagram illustrating a configuration example of the virtual machine monitor according to the first example embodiment of the present invention. Referring to FIG. 2, the virtual machine monitor 3 includes a virtual machine interface 31, a request destination determination unit 32, an I/O device allocation unit 33, an I/O device manager interface 34, an address range table 35, a BDF number correspondence table 36, a NIC driver 37, and a resource file holding unit 38.

The virtual machine interface 31 is an interface for data exchange between the virtual machine 4 and the virtual machine monitor 3. For example, the virtual machine interface 31 is used for notification of information about a resource allocated to the virtual machine 4 from the virtual machine monitor 3 to the virtual machine 4, when the virtual machine monitor 3 boots up the virtual machine 4. Further, the virtual machine interface 31 is used for reception of a request from the virtual machine 4 by the virtual machine monitor 3 when the virtual machine 4 uses the I/O device 8.

When receiving a request regarding use of the I/O device 8 from the virtual machine 4, the request destination determination unit 32 determines whether a destination of the request is an I/O device managed by the virtual machine monitor 3 or an I/O device 8 managed by the I/O device manager 5, based on information included in the request.

In PCI-Express, an access to an I/O device is performed by use of a BDF number or a memory address. Accordingly, depending on a request type from the virtual machine 4 to the I/O device 8, the request destination determination unit 32 determines whether the request is for an I/O device managed by the virtual machine monitor 3 or by the I/O device manager 5, based on a BDF number or a memory address.

The I/O device allocation unit 33 has a function of allocating an I/O device 8 managed by the I/O device manager 5 to the virtual machine 4.

In general, when an I/O device is allocated to the virtual machine 4 by a PCI pass-through technology, the virtual machine monitor 3 specifies an identifier (e.g. a BDF number) of the I/O device allocated by the PCI pass-through technology. The specification methods include specifying by a command line option and a method of performing an operation on a graphical user interface (GUI) tool. When allocating an I/O device 8 managed by the I/O device manager 5 to the virtual machine 4, the I/O device allocation unit 33 also receives information about what type/specification of I/O device 8 is to be allocated to which virtual machine 4, from an external module (unillustrated) of the I/O device allocation unit 33 by some method.

The I/O device allocation unit 33 inquires of the I/O device manager 5 about availability of an I/O device 8 a type/specification of which is specified by the external module. When notified that the I/O device is available from the I/O device manager 5, the I/O device allocation unit 33 notifies the virtual machine 4 of existence of the I/O device 8 by use of an identifier and resource information of the I/O device 8 included in the notification from the I/O device manager 5, at a search for an I/O device performed at boot-up of the virtual machine 4.

The I/O device manager interface 34 is an interface for data exchange between the virtual machine monitor 3 and the I/O device manager 5. For example, the I/O device manager interface 34 may be provided by a communication interface such as a socket. For example, I/O device manager interface 34 is used when the virtual machine monitor 3 inquires of the I/O device manager 5 about availability of an I/O device 8 to be allocated to the virtual machine 4. Further, the I/O device manager interface 34 is used for transferring a request when the request from the virtual machine 4 to an I/O device is for an I/O device 8 managed by the I/O device manager 5.

The address range table 35 illustrated in FIG. 2 will be described.

The address range table 35 is a table holding information set to a BAR in an I/O device 8 allocated to the virtual machine 4. The address range table 35 is provided for each virtual machine 4. An entry is added to the address range table 35 by the virtual machine monitor 3 trapping data transmitted and received when the virtual machine 4 sets a BAR in the I/O device 8 at boot-up of the virtual machine 4.

FIG. 3 is a diagram illustrating a structure example of the address range table according to the first example embodiment of the present invention. Referring to FIG. 3, the address range table 35 is composed of a set of information including a starting address, an ending address, a physical BDF number, and a BAR number. Existence of an entry in the table means an access to an I/O device 8 managed by the I/O device manager 5.

The address range table 35 takes an address value as an input and outputs a physical BDF number and a BAR number corresponding to an address range, the address being greater than or equal to a starting address thereof and less than or equal to an ending address thereof. The starting address is an address set to the BAR, and the ending address is an address obtained by adding a size requested by the I/O device 8 including the BAR to the starting address. The physical BDF number is a BDF number set to the BAR in the I/O device 8 by the I/O device manager 5. On the other hand, a BDF number used by the virtual machine 4 is herein referred to as a virtual BDF number. The BAR number refers to numbers of a plurality of BARs from 0 to 5 included in the I/O device 8.

The BDF number correspondence table 36 illustrated in FIG. 2 will be described.

The BDF number correspondence table 36 is a table holding a correspondence between a virtual BDF number and a physical BDF number. The BDF number correspondence table 36 is provided for each virtual machine 4.

An entry is added to the BDF number correspondence table 36 by the virtual machine monitor 3 trapping data transmitted when the virtual machine 4 sets a PCI configuration register in an I/O device 8 at boot-up of the virtual machine 4.

FIG. 4 is a diagram illustrating a structure example of the BDF number correspondence table according to the first example embodiment of the present invention. Referring to FIG. 4, the BDF number correspondence table 36 is composed of a set of information including a virtual BDF number and a physical BDF number. The BDF number correspondence table 36 takes a virtual BDF number as an input, and a physical BDF number is obtained as an output.

The NIC driver 37 and the resource file holding unit 38 that are illustrated in FIG. 2 will be described.

The NIC driver 37 is a driver for the NIC 21.

The resource file holding unit 38 has a function of storing a value set to a PCI configuration register in an I/O device 8 by the I/O device manager 5, as a resource file.

The resource file is managed by a set of an identifier of a virtual machine 4 and a physical BDF number allocated to an I/O device 8. A file structure and a file format of the resource file may conform to a file structure and a file format of a resource file of an I/O device locally connected to the virtual machine monitor 3. For example, when the virtual machine monitor 3 is constructed with a Linux (registered trademark)-based system, the resource file may conform to a file structure and a file format using /sys/bus/pci/devices/ <BDF number>directory and below.

Next, a configuration of the I/O device manager 5 illustrated in FIG. 1 will be described.

Figure 5:
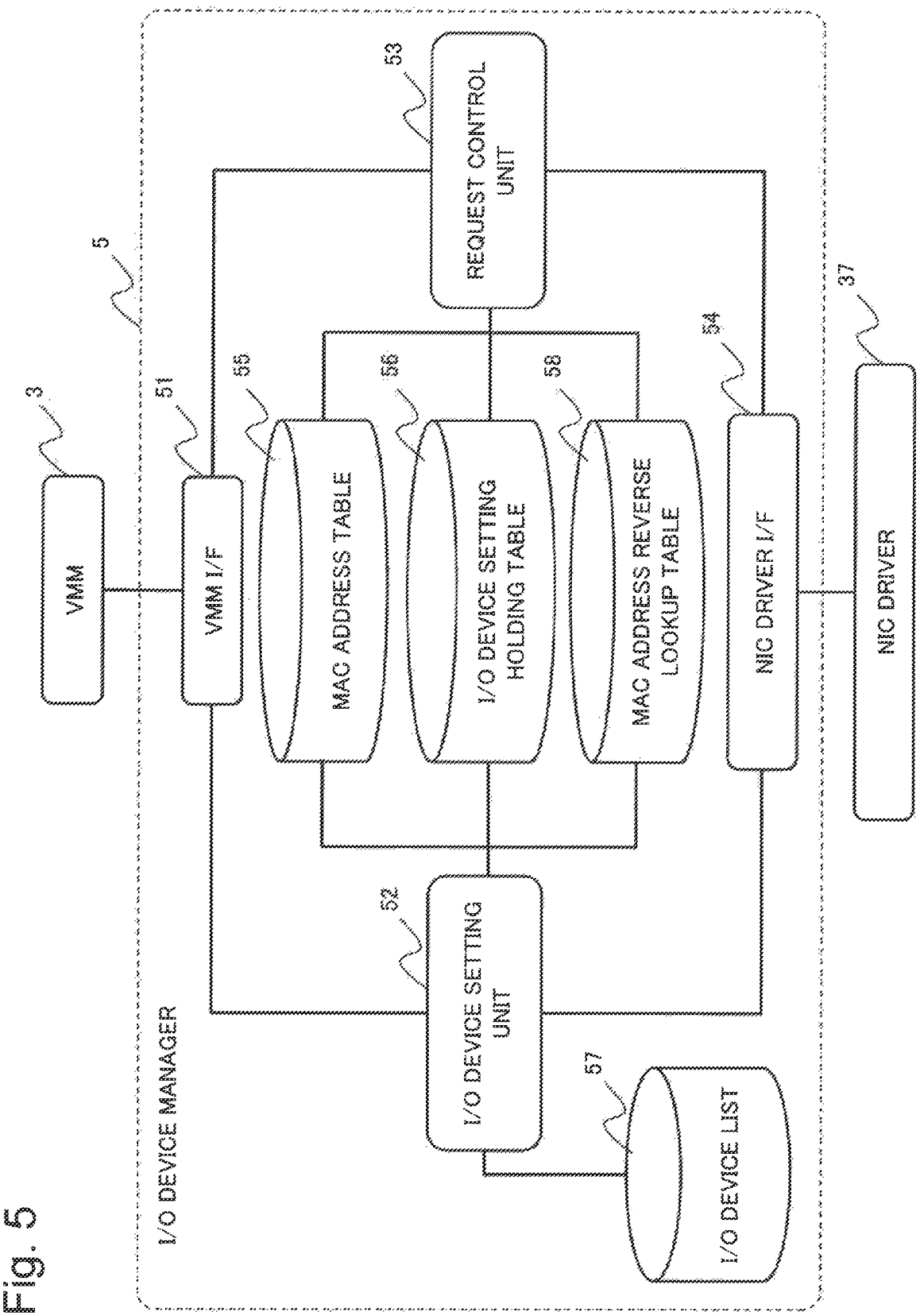
FIG. 5 is a block diagram illustrating a configuration example of an I/O device manager according to the first example embodiment of the present invention.

FIG. 5 is a block diagram illustrating a configuration example of the I/O device manager according to the first example embodiment of the present invention.

Referring to FIG. 5, the I/O device manager 5 includes a virtual machine monitor interface 51, an I/O device setting unit 52, a request control unit 53, a NIC driver interface 54, a MAC address table 55, an I/O device setting holding table 56, an I/O device list 57, and a MAC address reverse lookup table 58.

The virtual machine monitor interface 51 is an interface for data exchange between the virtual machine monitor 3 and the I/O device manager 5. For example, the virtual machine monitor interface 51 may be provided by a communication interface such as a socket.

For example, the virtual machine monitor interface 51 is used when receiving from the virtual machine monitor 3 an inquiry about whether or not an I/O device 8 to be allocated to the virtual machine 4 by the virtual machine monitor 3 is available. Further, the virtual machine monitor interface 51 is used for receiving through the virtual machine monitor 3 a request from the virtual machine 4 to an I/O device 8.

The I/O device setting unit 52 has a function of initializing an I/O device 8. The initialization of an I/O device 8 means setting values to a PCI configuration register and allocation of a physical BDF number. The physical BDF number may have an independent number space for each virtual machine 4 and may be set to use an identical physical BDF number between virtual machines 4.

The I/O device setting unit 52 searches the I/O device list 57 in response to an inquiry about availability of an I/O device 8 from the virtual machine monitor 3 and initializes an I/O device matching a condition. Further, the I/O device setting unit 52 reflects initialization details in the MAC address table 55, the I/O device setting holding table 56, and the MAC address reverse lookup table 58.

The request control unit 53 has a function of processing an access request from the virtual machine 4 to an I/O device 8, the request being received through the virtual machine monitor 3, and a request from an I/O device 8. The request refers to an I/O read/write request, a memory read/write request, a configuration read/write request, and a message request that are defined in PCI-Express.

The request control unit 53 has a function of constructing a TLP packet, based on an access request from the virtual machine 4 received through the virtual machine monitor 3, and constructing an Ethernet frame including the TLP packet as a payload. Data set to headers of the packet and the frame are obtained from information included in the access request from the virtual machine 4 received through the virtual machine monitor 3, and information held by the MAC address table 55 and the I/O device setting holding table 56.

Further, the request control unit 53 has a function of decapsulating a frame when receiving the frame encapsulating a TLP packet by an Ethernet frame, a source of the TLP packet being an I/O device 8. Further, the request control unit 53 has a function of extracting information such as a memory address of an access destination from the extracted TLP packet and transferring the information to the virtual machine monitor 3.

The NIC driver interface 54 is an interface for issuing a request for transmission of an Ethernet frame to the NIC driver 37 and is an interface for receiving an Ethernet frame from the NIC driver 37. For example, the interface is an interface provided by a general-purpose OS such as Windows (registered trademark) or Linux (registered trademark).

The MAC address table 55 will be described.

The MAC address table 55 is a table holding information associating an identifier of a virtual machine with a physical BDF number and a MAC address of an I/O side network interface 6 connected to an I/O device 8 with the physical BDF number.

Figure 6:
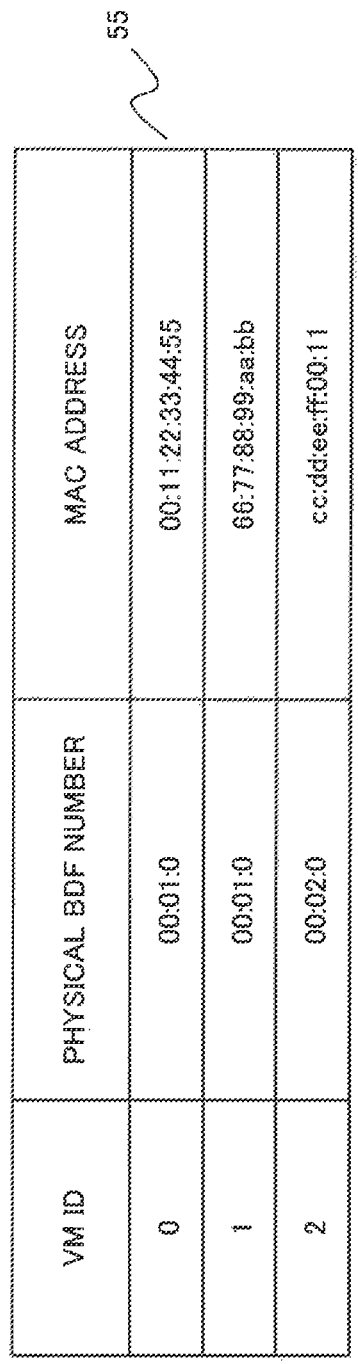
FIG. 6 is a diagram illustrating a structure example of a MAC address table according to the first example embodiment of the present invention.

FIG. 6 is a diagram illustrating a structure example of the MAC address table according to the first example embodiment of the present invention. The MAC address table 55 takes an identifier of a virtual machine and a physical BDF number as inputs and outputs a MAC address.

The I/O device setting holding table 56 will be described.

The I/O device setting holding table 56 is a table holding a value set to a PCI configuration register in an I/O device 8. The I/O device setting holding table 56 is provided for each virtual machine 4.

Figure 7:
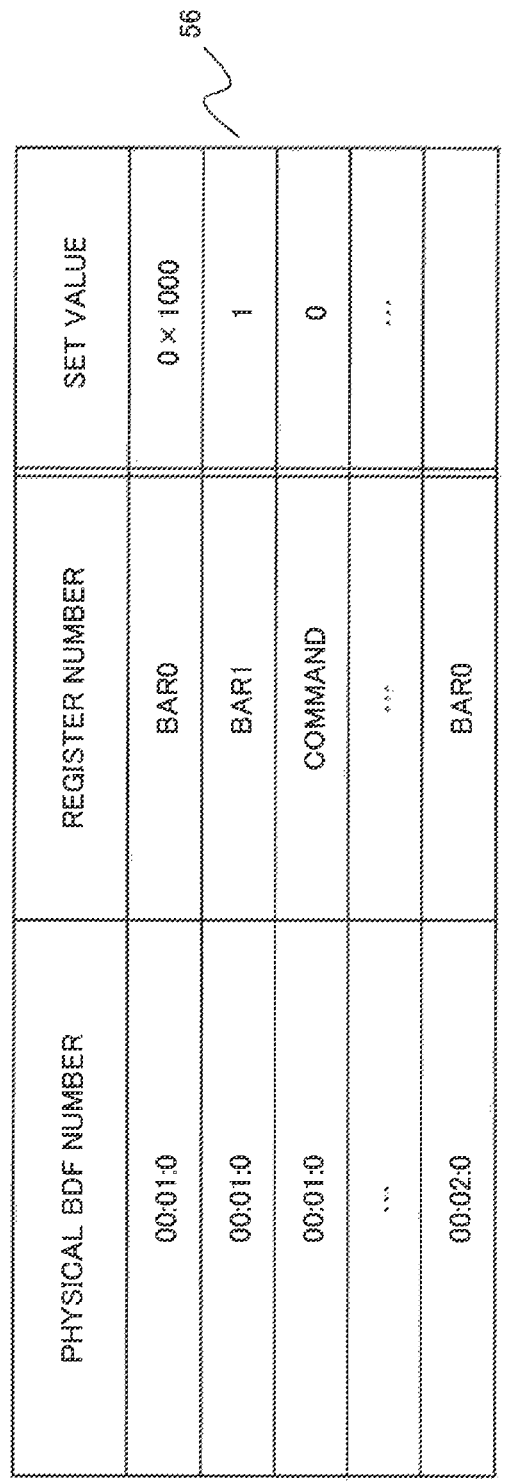
FIG. 7 is a diagram illustrating a structure example of an I/O device setting holding table according to the first example embodiment of the present invention.

FIG. 7 is a diagram illustrating a structure example of the I/O device setting holding table according to the first example embodiment of the present invention. The I/O device setting holding table 56 takes a physical BDF number and a register number as inputs and outputs a set value for a register with the input register number with respect to an I/O device 8 related to the input physical BDF number. Although the register number is stated by a register name such as a BAR 0 and a BAR 1 in FIG. 7, a method using an address of each register in a PCI configuration register may be considered instead of specification by a register name.

The I/O device list 57 illustrated in FIG. 5 will be described.

The I/O device list 57 has a function of holding a set of information including a device type and a specification of an I/O device 8, a MAC address of an I/O side network interface 6 connected to the I/O device 8, and an identifier of a virtual machine 4 being an allocation destination of the I/O device 8.

FIG. 8 is a diagram illustrating a structure example of the I/O device list according to the first example embodiment of the present invention. In the I/O device list 57, a device type and a specification are taken as inputs, and a MAC address and allocation status of the I/O device 8 are obtained as outputs.

The device type is information indicating a type of an I/O device 8, that is, classifications of the I/O device 8 such as a NIC, a GPU, a solid state drive (SSD), and a disk controller.

The specification is information indicating performance, a memory capacity, a disk capacity, and the like of an I/O device 8. For example, the specification includes a transfer rate in a case of a NIC, a core clock speed and a memory capacity of a GPU, or a generation of the GPU in a case of a GPU, a capacity and data read/write performance in a case of an SSD, and the like. Information to be stated in the specification field is defined by a designer of the computer system 1 or an operator of the computer system 1. When an I/O device 8 is already allocated to any virtual machine 4, an identifier of the virtual machine 4 is set to the allocation destination virtual machine 4 field, and when the device is unallocated, a value indicating the status is set.

The MAC address reverse lookup table 58 illustrated in FIG. 5 will be described.

The MAC address reverse lookup table 58 is a table for acquiring information about an identifier of a virtual machine 4 using an I/O device 8 connected to an I/O side network interface 6 with a MAC address, based on information about the MAC address.

FIG. 9 is a diagram illustrating a structure example of the MAC address reverse lookup table according to the first example embodiment of the present invention. The MAC address reverse lookup table 58 takes a MAC address as an input and outputs an identifier of a virtual machine.

The various tables and the list that are illustrated in FIGS. 2 and 5 are stored in a storage unit (unillustrated) such as a memory provided in the hardware 2, and the resource file holding unit 38 corresponds to part of the storage unit. The above holds for other example embodiments to be described later, and detailed description thereof is omitted.

Description of Operation

Next, an operation of the computer system according to the present example embodiment will be described with reference to drawings.

First, a method of initializing an I/O device 8 at boot-up of the virtual machine 4 will be described.

Figure 10:
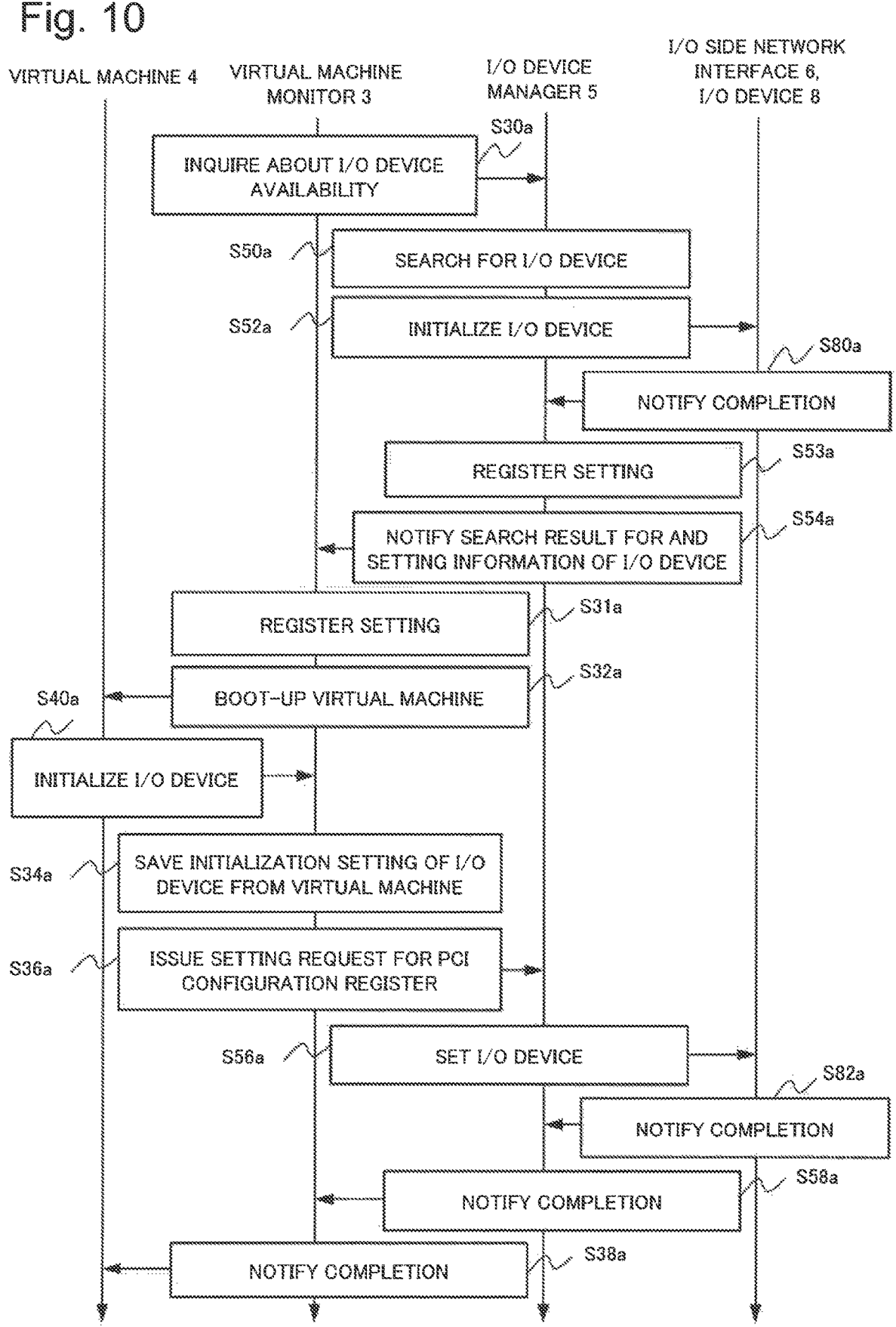
FIG. 10 is a sequence diagram illustrating operations of the virtual machine monitor, a virtual machine, the I/O device manager, an I/O side network interface, and an I/O device when the virtual machine is booted up, according to the first example embodiment of the present invention.

FIG. 10 is a sequence diagram illustrating operations of the virtual machine monitor, the virtual machine, the I/O device manager, the I/O side network interface, and an I/O device at boot-up of the virtual machine, according to the first example embodiment of the present invention.

First, in order to check existence or nonexistence of an I/O device 8 required for an operation of the virtual machine 4, the I/O device allocation unit 33 provided in the virtual machine monitor 3 notifies the I/O device manager 5 of an identifier of the virtual machine 4 and a type and a specification of an I/O device 8 to be allocated to the virtual machine 4 (Step S30a).

The I/O device setting unit 52 provided in the I/O device manager 5 refers to the I/O device list 57 and searches for availability of the corresponding I/O device 8 (Step S50a). When an available device is found, the I/O device setting unit 52 refers to the I/O device list 57 and changes a default value stated in a field for an identifier of an allocation destination virtual machine 4 in an entry related to the available I/O device 8 to the identifier of the virtual machine 4 notified by the virtual machine monitor 3.

When an I/O device 8 allocable to the virtual machine 4 is found, the I/O device setting unit 52 initializes the I/O device 8 (Step S52a).

At the initialization in Step S52a, the I/O device setting unit 52 determines a BDF number (physical BDF number) to be allocated to the I/O device 8 and registers in the MAC address table 55 a set of information including the identifier of the virtual machine 4, the physical BDF number, and a MAC address. Further, the I/O device setting unit 52 registers in the MAC address reverse lookup table 58 a set of information including the MAC address, and the identifier of the virtual machine 4. The MAC address is read by the I/O device setting unit 52 when the I/O device setting unit 52 accesses the I/O device list 57 in Step S50a in FIG. 10. Then, the I/O device setting unit 52 constructs a TLP packet for a configuration read/write request using the physical BDF number and constructs an Ethernet frame including the constructed TLP packet as a payload.

Out of PCI configuration registers in the I/O device 8, the I/O device setting unit 52 reads a vendor ID register and class code register, and sets values to a BAR, a command register, a cache line size register, and a latency timer register. The read/written pieces of information are held in the I/O device setting unit 52 to be passed to the virtual machine monitor 3 as information of the I/O device. For example, the information set to the BAR includes information indicating whether an address space requested by the I/O device 8 is an I/O space or a memory space, and information indicating a size of the space requested by the I/O device 8. The pieces of information are required when the virtual machine 4 initializes the PCI-Express fabric at boot-up.

With regard to a BDF number allocated to an I/O device 8 by the I/O device setting unit 52 and a value (a range of a memory space or a range of an I/O space) set to a BAR by the I/O device setting unit 52, arbitrary values may be set as long as values do not overlap between I/O devices 8 allocated to the same virtual machine 4. In other words, the BDF number space, the memory space, and the I/O space are independent for each virtual machine 4. The reason is that the I/O device setting unit 52 uses an identifier of a virtual machine 4 for identification of an I/O device 8.

After performing the initialization in Step S52a, the I/O device setting unit 52 transmits an Ethernet frame including a TLP packet for a configuration write request as a payload to the I/O device 8 through the NIC driver interface 54, the NIC driver 37, and the NIC 21.

When receiving the Ethernet frame from the I/O device manager 5, the I/O side network interface 6 decapsulates the Ethernet frame and extracts the TLP packet. After processing the request in accordance with the TLP packet, the I/O device 8 transmits a TLP packet for a completion to the I/O device manager 5 (Step S80a).

The TLP packet is encapsulated into an Ethernet frame in the I/O side network interface 6 and then is transferred to the I/O device manager 5 through the network 7. A MAC address of the NIC 21 may be previously set to the I/O side network interface 6. Further, when the I/O side network interface 6 communicates with the I/O device manager 5 for authentication, the MAC address of the NIC 21 being a communication counterpart may be notified to the I/O side network interface 6.

Every time a completion packet is received in response to a configuration write request issued to the I/O device 8, the I/O device setting unit 52 registers a value set to the register in the I/O device setting holding table 56 along with a physical BDF number and a register number (Step S53a).

With regard to a BDF number allocated to the I/O device 8, the I/O device setting unit 52 generates a piece of setting information of a virtual PCI-PCI bridge for each bus number and registers the information in the I/O device setting holding table 56. The reason is that, as described in Background Art, at initialization of the PCI-Express fabric, a downstream bus is not searched until a bridge device such as a PCI-Express switch device is detected.

Assuming that setting information of a virtual PCI-PCI bridge is not generated, the virtual machine 4 does not search a downstream bus when initializing the PCI-Express fabric at boot-up. Consequently, an I/O device 8 assigned with a bus number of the downstream bus is not recognized by the virtual machine 4.

Since a PCI-Express switch is logically a combination of PCI-PCI bridges, setting information of a virtual PCI-PCI bridge is generated, according to the present example embodiment. The setting information at least includes information of a BDF number, a vendor ID register, a class code register, a BAR, a command register, a cache line size register, a latency timer register, a primary bus register, a secondary bus register, a subordinate bus register, a memory base address register, an I/O base address register, a memory limit address register, and an I/O limit address register.

When receiving a completion packet for every configuration write request issued to the I/O device 8, the I/O device setting unit 52 notifies the virtual machine monitor 3 of the setting details along with the identifier of the virtual machine 4 and the physical BDF number (Step S54a).

Out of the information notified in Step S54a in FIG. 10, the I/O device allocation unit 33 saves a value read from/written into the PCI configuration register in the resource file holding unit 38 as a resource file (Step S31a).

The virtual machine monitor 3 boots up the virtual machine 4 (Step S32a).

At the boot-up, the virtual machine 4 performs initialization processing on a (virtual) PCI-Express fabric (recognized by the virtual machine 4) (Step S40a). The virtual machine monitor 3 traps the processing, and the request destination determination unit 32 provided in the virtual machine monitor 3 responds to the initialization processing, based on the setting information of the I/O device 8 held in the resource file holding unit 38.

In most cases, the virtual machine 4 uses not only an I/O device 8 managed by the I/O device manager 5 but also a virtual device prepared by the virtual machine monitor 3 and an I/O device provided in the hardware 2, by the PCI pass-through. Accordingly, for example, when detecting that initialization of every virtual device and every I/O device provided in the hardware 2 is completed, the virtual machine monitor 3 subsequently initializes the I/O device 8 managed by the I/O device manager 5.

The method of trapping initialization processing of the PCI-Express fabric by the virtual machine 4 will be described by use of an example.

When the virtual machine 4 uses a processor based on an Intel x86 architecture as a virtual processor, initialization of the PCI-Express fabric is performed by an in/out instruction. The virtual machine monitor 3 traps the in/out instruction. After the instruction is trapped, the request destination determination unit 32 acquires related information from the resource file holding unit 38, based on a register number of an access destination of the virtual machine 4. Then, the request destination determination unit 32 notifies the virtual machine 4 of a vendor ID and a class code. Further, the request destination determination unit 32 behaves as though the unit is able to set the setting of an I/O device 8, such as a latency timer register, already set by the I/O device manager 5 to a corresponding register in the I/O device 8 without reflecting the setting in the I/O device 8, and emulates a BAR setting sequence.

The request destination determination unit 32 registers in the BDF number correspondence table 36 a BDF number (virtual BDF number) the virtual machine 4 attempts to set to the I/O device 8 at the setting of the latency timer register number or the like, along with a physical BDF number (Step S34*a*). Further, the request destination determination unit 32 determines a value the virtual machine 4 attempts to set to the BAR in the I/O device 8 at the emulation of the BAR setting sequence to be a starting address and determines a value obtained by adding a size requested by the BAR to the starting address to be an ending address, the size being read from a resource file. Then, the request destination determination unit 32 registers the starting address and the ending address in the address range table 35 along with the physical BDF number and the BAR number (Step S34*a*).

In general, PCI configuration registers include some register set by a driver in an I/O device 8 after boot-up of an OS or a virtual machine. With regard to setting of such a register, the request destination determination unit 32 provided in the virtual machine monitor 3 reflects the setting in the resource file holding unit 38 and also issues to the I/O device manager 5 an issuance request for a configuration read/write request to the I/O device 8 (Step S36*a*). Whether issuance of a configuration read request is necessary depends on a setting method of a register being a setting target. When issuance of a configuration read request is necessary, the request destination determination unit 32 issues the issuance request along with information indicating an identifier of the virtual machine 4, a physical BDF number (acquired from the BDF number correspondence table 36) of the target I/O device 8, and an access type. The access type herein refers to information such as a configuration read request or a configuration write request.

In response to a search for a PCI-Express device from the virtual machine 4, the request destination determination unit 32 returns an I/O device 8 in a resource file passed from the I/O device manager 5 or a PCI-PCI bridge, in order of physical BDF number.

Thus, by responding to the search, initialization down to an I/O device 8 connected downstream of a PCI-PCI bridge may be performed.

When a configuration read/write request from the virtual machine 4 is a configuration of a PCI-PCI bridge, the request destination determination unit 32 does not notify the request to the I/O device manager 5 and returns a suitable value to the virtual machine 4. The reason is that a PCI-PCI bridge is a virtual device, and an actual setting target does not exist.

When receiving a request issuance request from the virtual machine monitor 3, the request control unit 53 provided in the I/O device manager 5 constructs a TLP packet, based on the request issuance request. Then, the request control unit 53 constructs an Ethernet frame including the TLP packet as a payload and transmits the Ethernet frame to the I/O device 8 (Step S56*a*). Information such as a MAC address and a physical BDF number that are set to headers of the TLP packet and the Ethernet frame is obtained from information included in the request from the virtual machine monitor 3 and a result of reference to the MAC address table 55 by use of the information. The request control unit 53 holds the request until a response (a completion TLP packet) to the Ethernet frame that the setting is properly performed is returned from the I/O device 8.

When receiving the TLP packet decapsulated by the I/O side network interface 6 from the I/O side network interface 6, the I/O device 8 sets a PCI configuration register in accordance with a content stated in the packet.

After completion of the setting, the I/O device 8 transmits a completion packet to the I/O device manager 5 (Step S82*a*).

When receiving the completion packet transmitted from the I/O device 8, the request control unit 53 registers in the I/O device setting holding table 56 the setting details along with the physical BDF number and a register number. Then, the request control unit 53 notifies the virtual machine monitor 3 that the setting is completed (Step S58*a*). The notification at least includes the identifier and the physical BDF number of the virtual machine 4, and when the request from the virtual machine monitor 3 is a configuration read request, read data are also included. The identifier of the virtual machine 4 is obtained by referring to the MAC address reverse lookup table 58 by use of a source MAC address in the Ethernet header assigned when the received completion packet is encapsulated.

When receiving the notification that the setting is completed from the I/O device manager 5, the request destination determination unit 32 notifies the virtual machine 4 that the setting is completed or the read data are received (Step S38*a*).

Next, an operation when the virtual machine 4 issues a memory read/write request to an I/O device 8 will be described.

Figure 11:
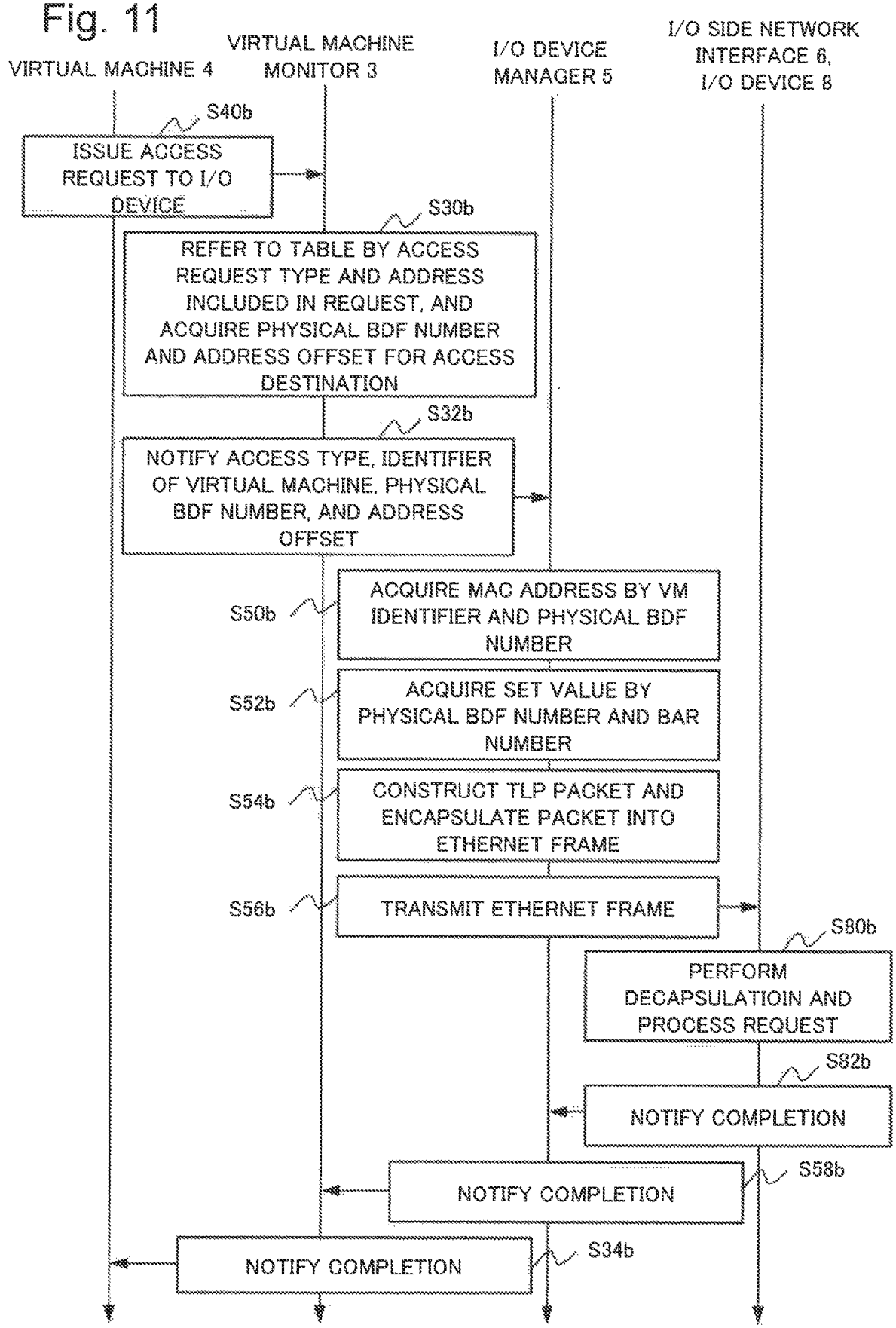
FIG. 11 is a sequence diagram illustrating a processing flow when a memory read/write request is issued from the virtual machine to the I/O device, according to the first example embodiment of the present invention.

FIG. 11 is a sequence diagram illustrating a processing flow when a memory read/write request is issued from the virtual machine to an I/O device, according to the first example embodiment of the present invention.

The virtual machine 4 issues an access request to a memory area in an I/O device 8 (Step S40*b*). The access request is trapped by the virtual machine monitor 3. The virtual machine monitor 3 obtains an identifier of the virtual machine 4, an access request type (assumed to be a memory access or an I/O access), and information about an access destination (a memory address) from the virtual machine 4.

By the access request being trapped by the virtual machine monitor 3, the identifier of the virtual machine 4, the access request type, and the information about the access destination are passed to the request destination determination unit 32 provided in the virtual machine monitor 3 from the virtual machine 4. The request destination determination unit 32 determines that the access request is a memory access from the access request type. Then, the request destination determination unit 32 refers to the address range table 35 by use of the identifier of the virtual machine 4 and the information about the access destination (the memory address), and obtains a physical BDF number and a BAR number (Step S30b). Then, the request destination determination unit 32 obtains an address offset value by use of a value of a starting address in the address range table 35. The address offset value is obtained by subtracting the value of the starting address from the information about the access destination (the memory address).

When the access type is a read/write from/to a PCI configuration register in the I/O device 8, the identifier of the virtual machine 4, the access request type (configuration), information about the access destination (a virtual BDF number), and a register number of the access destination are notified to the request destination determination unit 32 from the virtual machine 4. The request destination determination unit 32 refers to the BDF number correspondence table 36 by use of the identifier of the virtual machine 4 and the virtual BDF number, and obtains a physical BDF number.

The request destination determination unit 32 notifies the I/O device manager 5 of the identifier of the virtual machine 4, the access type, the physical BDF number, the BAR number, and the address offset value (Step S32b).

The request control unit 53 provided in the I/O device manager 5 refers to the MAC address table 55 by use of the identifier of the virtual machine 4 and the physical BDF number that are received from the virtual machine monitor 3, and obtains a MAC address (Step S50b).

The request control unit 53 refers to the I/O device setting holding table 56 by use of the physical BDF number and the BAR number, and obtains a value set to the BAR in the access target (Step S52b). The request control unit 53 obtains an address value of the access destination by adding the address offset value to the value set to the BAR.

The request control unit 53 constructs an Ethernet frame including a TLP packet as a payload, by use of the information received from the virtual machine monitor 3, and the MAC address and the address value of the access destination that are obtained by referring to the MAC address table 55 and the I/O device setting holding table 56 (Step S54b).

The request control unit 53 transmits the constructed Ethernet frame to the I/O device 8 through the network 7 (Step S56b).

When receiving the Ethernet frame from the I/O device manager 5, the I/O side network interface 6 decapsulates the Ethernet frame and obtains the TLP packet. Then, the I/O side network interface 6 passes the acquired TLP packet to the I/O device 8. When receiving the TLP packet from the I/O side network interface 6, the I/O device 8 processes the request (Step S80b).

When the processing of the request is completed, the I/O device 8 generates a TLP packet for a completion packet (in a case of a memory read request or an I/O read/write request) and transmits the TLP packet to the I/O device manager 5 (Step S82b). The TLP packet is encapsulated into an Ethernet frame by the I/O side network interface 6.

When receiving the completion packet from the I/O device 8, the request control unit 53 notifies the virtual machine monitor 3 of the reception (Step S58b). When a request being a basis of the access request issued by the virtual machine 4 is a memory read request or an I/O read request, read data are stored in the completion packet, and therefore the read data are also passed to the virtual machine monitor 3.

When receiving from the I/O device manager 5 information that the completion from the I/O device 8 is received, the virtual machine monitor 3 notifies the virtual machine 4 of the reception (Step S34b). When also receiving read data from the I/O device manager 5, the virtual machine monitor 3 stores the data in a suitable memory area. For example, the suitable memory area refers to a host physical address corresponding to a memory area (a guest physical address) specified as a read destination by the virtual machine 4.

Next, an operation when an I/O device 8 issues a memory read/write request to the virtual machine 4 will be described.

Figure 12:
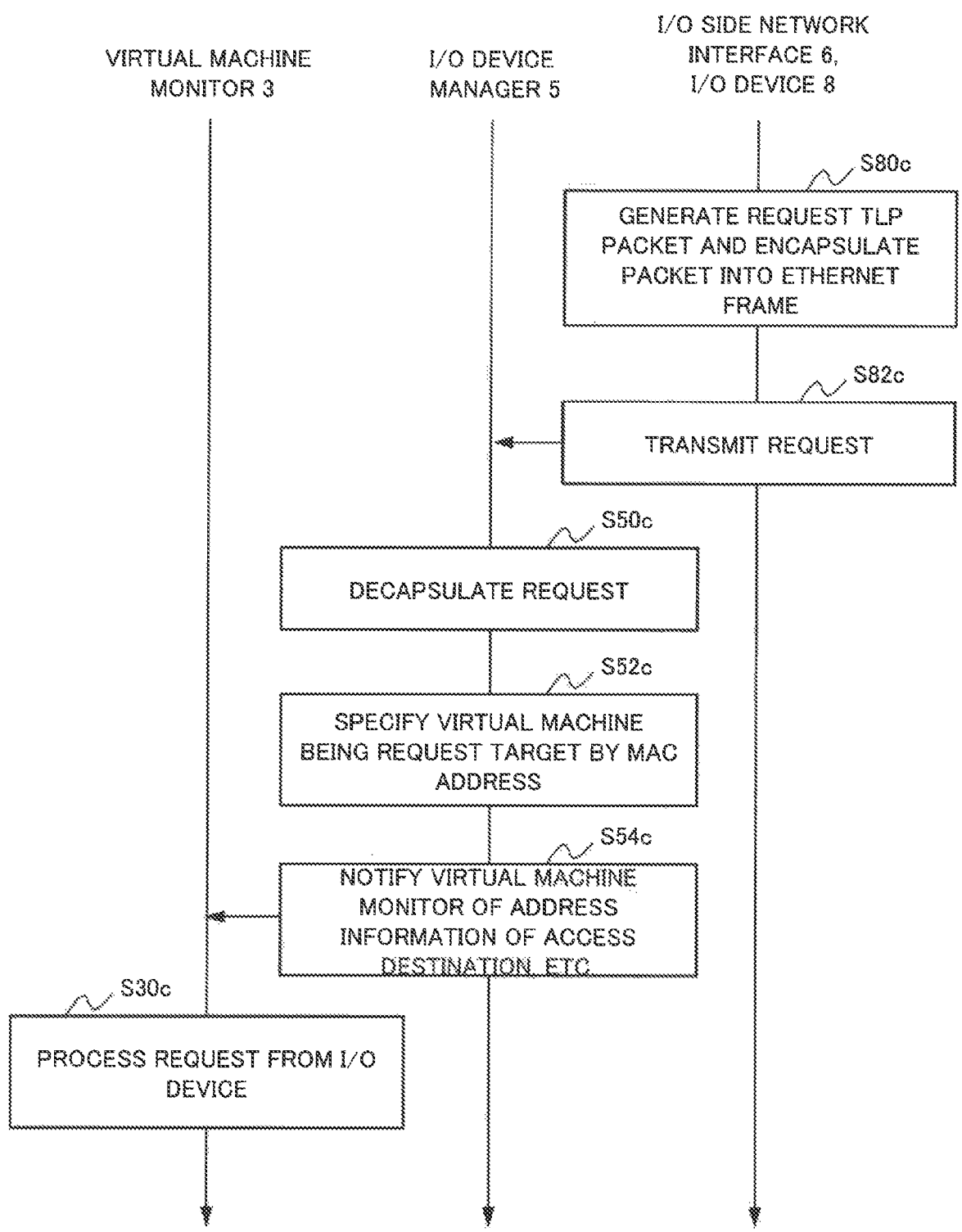
FIG. 12 is a sequence diagram illustrating a processing flow when a memory read/write request is issued from the I/O device to the virtual machine, according to the first example embodiment of the present invention.

FIG. 12 is a sequence diagram illustrating a processing flow when an I/O device issues a memory read/write request to the virtual machine, according to the first example embodiment of the present invention.

In general, a memory read/write request from an I/O device 8 is performed by direct memory access (DMA) transfer. However, handling in the I/O device manager 5 needs to be performed on a memory read/write request from the I/O device 8, according to the present example embodiment, and therefore the I/O device 8 does not directly access a memory (unillustrated) provided in the hardware 2.

Referring to FIG. 12, first, an I/O device 8 generates a TLP packet for a memory read/write request. Next, an I/O side network interface 6 connected to the I/O device 8 encapsulates the generated TLP packet into an Ethernet frame (Step S80c). At the encapsulation, the I/O side network interface 6 uses as destination information of the Ethernet frame a MAC address of a NIC 21, the MAC address being previously acquired and held.

The I/O side network interface 6 transmits the Ethernet frame generated in Step S80c in FIG. 12 to the I/O device manager 5 (Step S82c).

When receiving the Ethernet frame including request information from the I/O side network interface 6, the request control unit 53 provided in the I/O device manager 5 decapsulates the request included in the Ethernet frame (Step S50c). At the same time, the request control unit 53 refers to the MAC address reverse lookup table 58 by use of a value of a MAC address indicating a source of the Ethernet frame and obtains an identifier of the virtual machine 4 (Step S52c).

The request control unit 53 notifies the virtual machine monitor 3 of information such as a destination address included in the request, the identifier of the virtual machine 4 obtained in Step S52c in FIG. 12, and a data size to be read or a data size to be written (Step S54c). When the request is a memory write request, the request control unit 53 also notifies the virtual machine monitor 3 of write target data.

The virtual machine monitor 3 processes the request from the I/O device 8, based on the information received from the request control unit 53 (Step S30c). As described above, a memory read/write request from an I/O device 8 is generally performed by DMA transfer, and therefore a memory address of an access destination needs to be previously notified to the I/O device 8. The information about the destination address included in the request is a physical address specified by the virtual machine 4 (a guest physical address) and is a physical address corresponding to a virtual memory allocated by the virtual machine monitor 3, and therefore is different from a location of an actual physical memory (a host physical address). Accordingly, the virtual machine monitor 3 performs address conversion from the guest physical address to the host physical address by a function simulating an I/O memory management unit (IOMMU) or the like, and performs a memory access.

Thus, an I/O device 8 managed in a BDF number space different from a BDF number space managed by the virtual machine monitor 3 may be allocated to the virtual machine 4 and used.

Next, a case of removing an I/O device 8 allocated to the virtual machine 4 while the virtual machine 4 is active will be described.

First, the virtual machine monitor 3 detects processing of the virtual machine 4 detaching a target I/O device 8, and the I/O device allocation unit 33 obtains a physical BDF number from the BDF number correspondence table 36.

Then, the I/O device allocation unit 33 specifies an entry of the target I/O device 8 in the address range table 35, the BDF number correspondence table 36, and the resource file holding unit 38 by use of an identifier of the virtual machine and the physical BDF number, and deletes the specified entry from each table.

Then, the I/O device allocation unit 33 notifies the I/O device manager 5 of the physical BDF number of the I/O device 8 being a deletion target and the identifier of the virtual machine.

The I/O device manager 5 receives a notification of removal of the I/O device 8 from the virtual machine monitor 3. The I/O device setting unit 52 refers to the MAC address table 55, based on the notified identifier of the virtual machine and the notified physical BDF number, and acquires a MAC address of an I/O side network interface 6 connected to the target I/O device 8. Then, the I/O device setting unit 52 deletes the entry of the target from the MAC address table 55.

The I/O device setting unit 52 deletes an entry with a matching virtual machine identifier and a matching physical BDF number from the I/O device setting holding table 56. Further, the I/O device setting unit 52 refers to the MAC address reverse lookup table 58 by use of the MAC address and deletes an entry with a matching MAC address.

Then, the I/O device setting unit 52 issues a reset notification including an instruction to reset the I/O device 8 being a removal target to the I/O side network interface 6. Further, in the I/O device list 57, the I/O device setting unit 52 changes an allocation destination virtual machine ID in the I/O device list 57 to "unallocated" with respect to a device with a MAC address matching that of the I/O side network interface 6.

When receiving the reset notification of the I/O device 8 from the I/O device manager 5, the I/O side network interface 6 resets the I/O device 8.

Thus, the I/O device 8 can be removed while operating the virtual machine 4.

When an I/O device 8 is added to the virtual machine 4 already in operation, the I/O device 8 may be added to the virtual machine 4 by executing the respective steps in the procedure indicated in FIG. 10. However, the processing in Step S32*a* in the procedure indicated in FIG. 10 needs to be changed. Specifically, the processing in Step S32*a* becomes "NOTIFY ADDITION OF I/O DEVICE 8" instead of "BOOT-UP VIRTUAL MACHINE." At this time, the virtual machine monitor 3 sets a BDF number allocated to the I/O device 8 to be added, and an I/O space and a memory space that are to be set to a BAR in such a way not to be identical to those of another I/O device 8 used by the same virtual machine 4. In other words, the virtual machine monitor 3 operates in such a way that there is no overlap in a BDF number, and an I/O space and a memory space that are set to the BAR, between a plurality of I/O devices used by the same virtual machine 4.

Thus, the I/O device 8 can be added while operating the virtual machine 4.

Next, an effect of the present example embodiment will be described.

The present example embodiment manages an I/O device 8 allocated to the virtual machine 4 in an independent BDF number space for each virtual machine 4. The virtual machine 4 is able to use the I/O device 8 by the virtual machine monitor 3 converting the independent BDF number space for each virtual machine 4 into a BDF number used by the virtual machine 4. Consequently, a maximum number of I/O devices 8 supported by the BDF number space can be provided for each virtual machine 4, and even when a large number of virtual machines 4 operate on a server, a required number of I/O devices 8 can be connected.

Second Example Embodiment

Next, a second example embodiment of the present invention will be described in detail with reference to drawings. Note that a component similar to that according to the first example embodiment of the present invention is given a same reference sign, and detailed description thereof is omitted.

Figure 13:
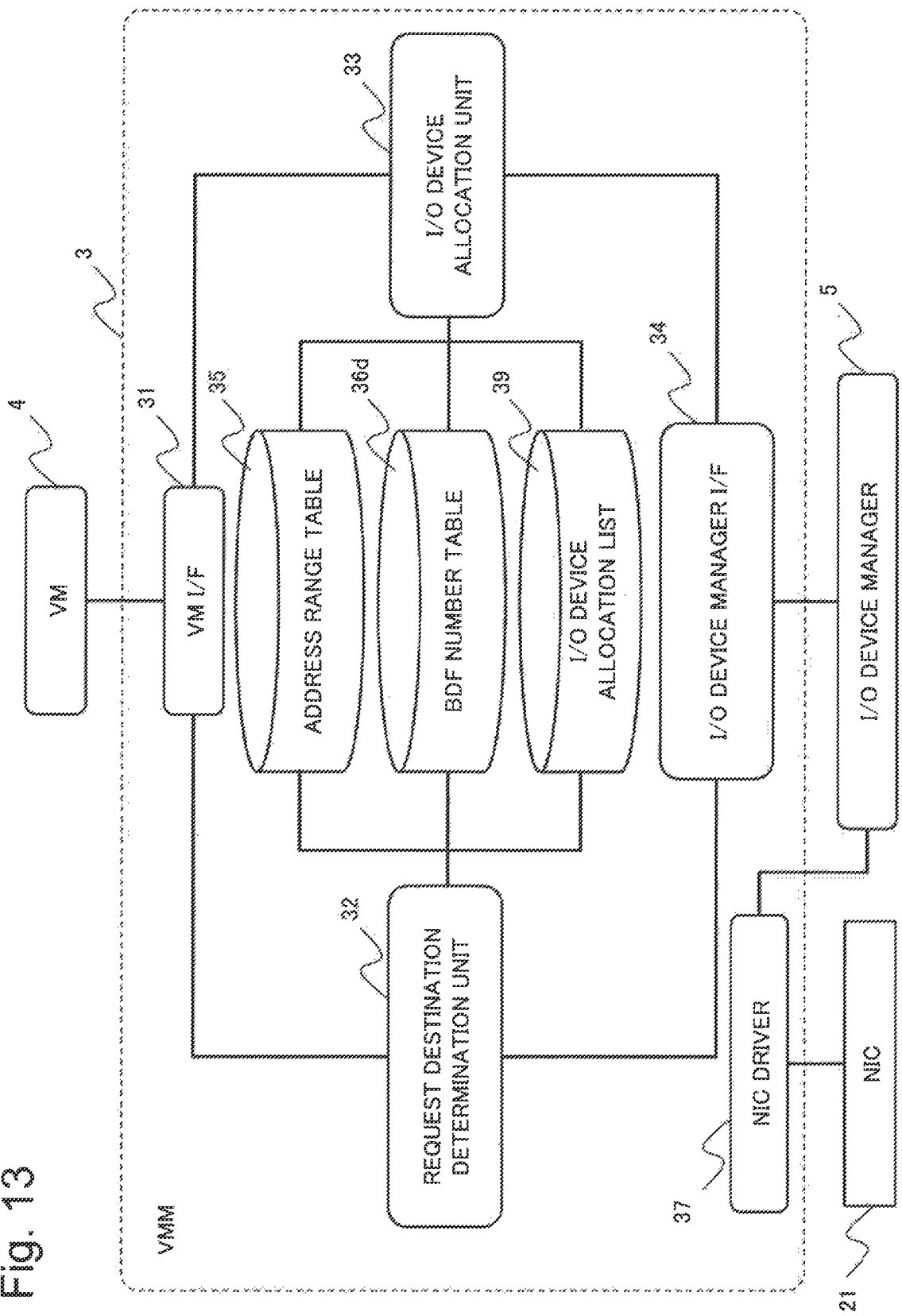
FIG. 13 is a block diagram illustrating a configuration example of a virtual machine monitor according to a second example embodiment of the present invention.

FIG. 13 is a block diagram illustrating a configuration example of a virtual machine monitor according to the second example embodiment of the present invention. Referring to FIG. 13, a virtual machine monitor 3 according to the present example embodiment does not include the BDF number correspondence table 36 and the resource file holding unit 38 compared with the configuration illustrated in FIG. 2, but instead includes a BDF number table 36*d* and an I/O device allocation list 39.

The BDF number table 36*d* will be described.

The BDF number table 36*d* is provided for each virtual machine 4 and is a table storing a BDF number of an I/O device 8 allocated to a virtual machine.

Figure 14:
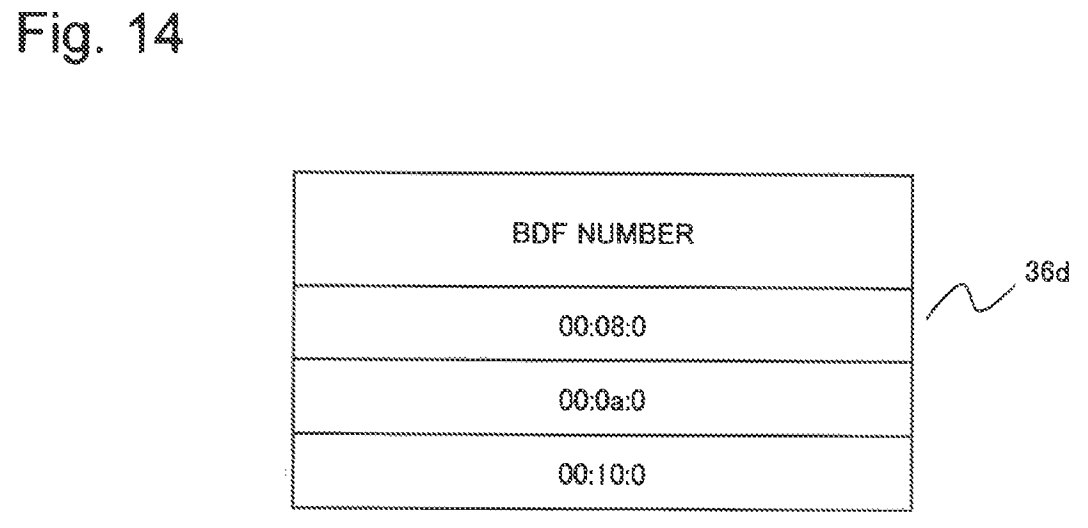

FIG. 14 is a diagram illustrating a structure example of the BDF number table according to the second example embodiment of the present invention. Referring to FIG. 14, the BDF number table 36*d* is configured to register a BDF number as an entry. The BDF number is a BDF number allocated by the virtual machine 4.

The I/O device allocation list 39 will be described.

The I/O device allocation list 39 is a list stating a vendor ID and a class code of an I/O device 8 allocated to a virtual machine 4 to be booted up, in order of recognition by the virtual machine 4.

Figure 15:
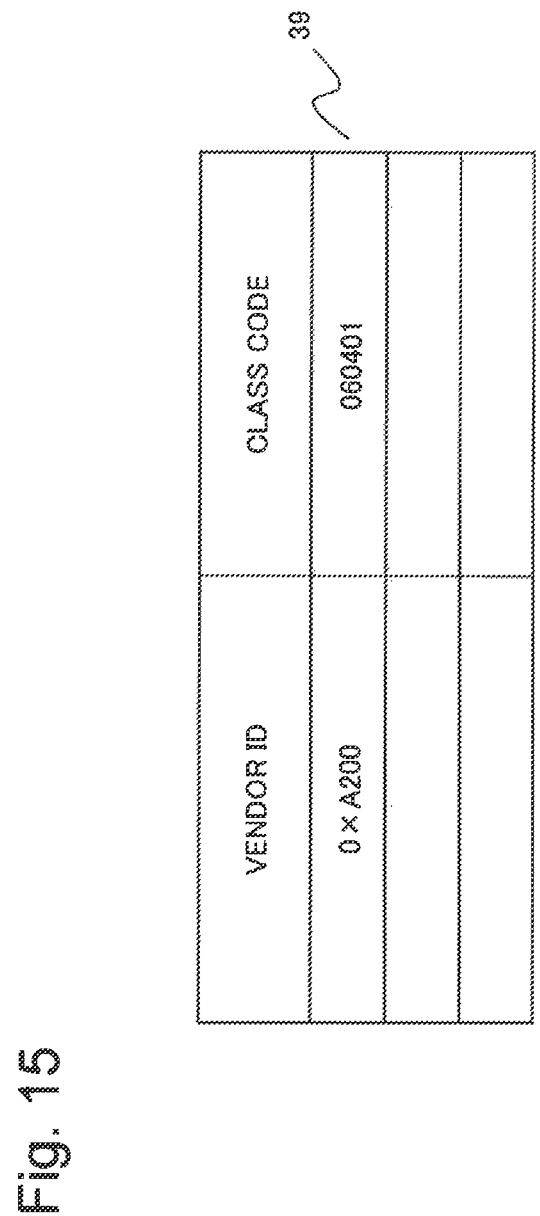
FIG. 15 is a diagram illustrating a structure example of an I/O device allocation list according to the second example embodiment of the present invention.

FIG. 15 is a diagram illustrating a structure example of the I/O device allocation list according to the second example embodiment of the present invention. Referring to FIG. 15, the I/O device allocation list 39 is a list of information composed of a set of a vendor ID and a class code.

Figure 16:
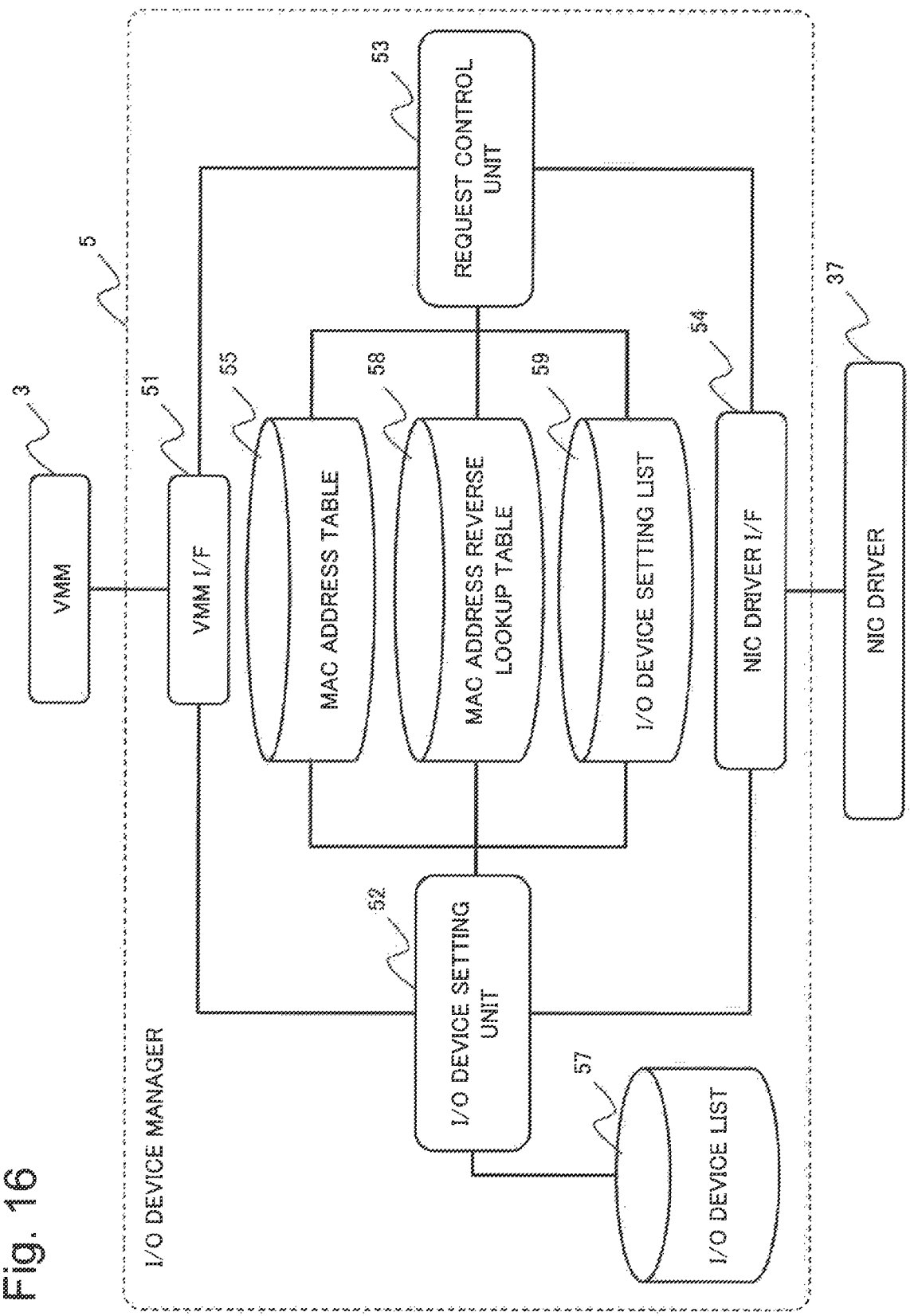
FIG. 16 is a diagram illustrating a configuration example of an I/O device manager according to the second example embodiment of the present invention.

FIG. 16 is a block diagram illustrating a configuration example of an I/O device manager according to the second example embodiment of the present invention. Referring to FIG. 16, an I/O device manager 5 according to the present example embodiment does not include the I/O device setting holding table 56 compared with the configuration illustrated in FIG. 5, but instead includes an I/O device setting list 59.

The I/O device setting list 59 will be described.

The I/O device setting list 59 is a list in which a set of a class code and a vendor ID of an I/O device 8 is registered, the I/O device 8 being selected from I/O devices 8 registered in an I/O device list 57, when an inquiry is made about availability of the I/O device by the virtual machine monitor 3.

Next, an operation of a computer system according to the present example embodiment will be described.

First, a method of initializing an I/O device 8 at boot-up of the virtual machine 4 will be described.

Figure 17:
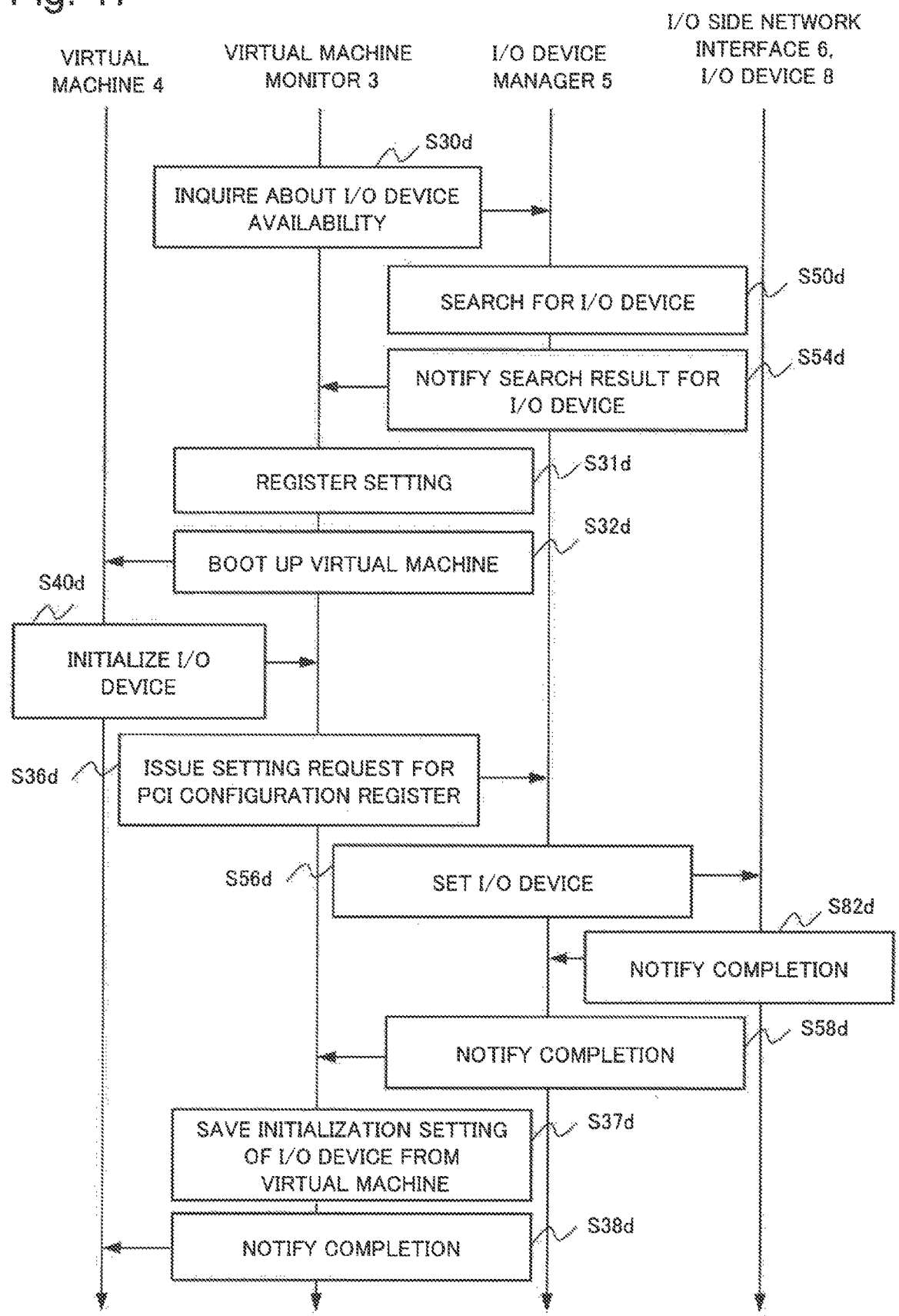
FIG. 17 is a sequence diagram illustrating operations of the virtual machine monitor, a virtual machine, the I/O device manager, and an I/O device when the virtual machine is booted up, according to the second example embodiment of the present invention.

FIG. 17 is a sequence diagram illustrating operations of the virtual machine monitor, the virtual machine, the I/O device manager, and an I/O device at boot-up of the virtual machine, according to the second example embodiment of the present invention.

Comparing FIG. 17 with FIG. 10, the present example embodiment is different in that the I/O device manager 5 does not perform setting/saving of an I/O device 8 before boot-up of the virtual machine 4 (Steps S52a, S80a, and S53a in FIG. 10). The setting of an I/O device 8 according to the present example embodiment is synchronized with initialization of a PCI-Express fabric performed at boot-up of the virtual machine 4.

Referring to FIG. 17, first, an I/O device allocation unit 33 provided in the virtual machine monitor 3 inquires of the I/O device manager 5 about I/O device availability (Step S30d). When inquiring about availability of a plurality of I/O devices, the I/O device allocation unit 33 sorts the I/O devices 8 in preferred order of recognition by the virtual machine 4 and inquires of the I/O device manager 5 about the availability.

In response to the inquiry about I/O device availability from the virtual machine monitor 3, an I/O device setting unit 52 provided in the I/O device manager 5 searches the I/O device list 57 for an I/O device 8 meeting a condition included in the inquiry (Step S50d).

The I/O device setting unit 52 notifies the virtual machine monitor 3 of a vendor ID and a class code of an I/O device 8 obtained as a result of the search (Step S54d). The vendor ID and the class code may be previously registered in the I/O device list 57 after extending the I/O device list 57 for registration of the vendor ID and the class code. Further, with regard to the vendor ID and the class code, the I/O device setting unit 52 may read a vendor ID and a class code of the detected I/O device 8 every time an inquiry is received from the virtual machine monitor 3 (FIG. 17 illustrating the former case). In the latter case, the I/O device setting unit 52 acquires a related MAC address from the I/O device list 57, constructs Ethernet frames including TLP packets (configuration read requests) for reading a vendor ID and a class code, respectively, as payloads, and transmits the frames to the I/O device 8. The I/O device setting unit 52 is able to obtain values of the vendor ID and the class code from payload parts of completions from the I/O device 8. When inquiries are made to a plurality of I/O devices 8, vendor IDs and class codes included in notifications to the virtual machine monitor 3 are sorted in order of I/O devices stated in the inquiries from the virtual machine monitor 3.

Further, in a case such as a number of devices inquired about by the virtual machine monitor 3 being a number (=32 or more) required to be accommodated in a plurality of buses, the I/O device setting unit 52 inserts a vendor ID and a class code of a virtual PCI-PCI bridge into a notification to the virtual machine monitor 3 at a timing of changing a bus number. For example, the timing of changing a bus number refers to inserting the vendor ID and the class code of the PCI-PCI bridge at every 31 requested I/O devices when a number of the requested I/O devices is 32 or more. Further, by inserting the vendor ID and the class code of the PCI-PCI bridge at the beginning of a notification, the virtual machine monitor 3 causes the PCI-PCI bridge to be recognized first when allocating I/O devices 8 managed by the I/O device manager 5 to the virtual machine 4, and therefore is able to cause initialization processing of an I/O device 8 to be performed from a bus number different from that of I/O devices previously recognized by the virtual machine 4.

Furthermore, instead of being inserted into a notification from the I/O device setting unit 52 to the virtual machine monitor 3, the vendor ID and the class code of the virtual PCI-PCI bridge may be inserted after the I/O device allocation unit 33 receives the notification from the I/O device manager 5. In this case, the virtual machine monitor 3 is aware of how many virtual devices are allocated to the virtual machine from configuration information of the virtual machine 4 or the like, and therefore is able to insert the vendor ID and the class code of the PCI-PCI bridge into a suitable location in the list.

The I/O device setting unit 52 holds the notification to the virtual machine monitor 3 in the I/O device setting list 59 after excluding the inserted information of the virtual PCI-PCI bridge.

When receiving from the I/O device manager 5 a list of the vendor ID and the class code of the I/O device 8 to be allocated to the virtual machine 4, the I/O device allocation unit 33 stores the list in the I/O device allocation list 39 (Step S31d).

The I/O device allocation unit 33 boots up the virtual machine 4 (Step S32d).

The virtual machine 4 initializes the PCI-Express fabric (Step S40d).

At a stage when the virtual machine monitor 3 completes allocation of every device other than an I/O device 8 managed by the I/O device manager 5, or the like, the request destination determination unit 32 performs allocation processing on an I/O device 8 registered in the I/O device allocation list 39 (Steps S36d to S58d). The procedure from Step S36d to Step S58d will be described in detail.

When trapping an access for initialization of an I/O device 8 from the virtual machine 4, the virtual machine monitor 3 refers to the BDF number table 36d by use of an identifier of the virtual machine 4 and a BDF number that are acquired by the request destination determination unit 32 at the trapping and determines whether or not an I/O device with the BDF number is an I/O device 8 managed by the I/O device manager 5. The BDF number being registered in the BDF number table 36d means that the I/O device is an I/O device 8 managed by the I/O device manager 5.

Next, the request destination determination unit 32 issues a setting request for a PCI configuration register to the I/O device manager 5 (Step S36d). The request destination determination unit 32 notifies the I/O device manager 5 of the identifier of the virtual machine, an access type, and the BDF number of the I/O device 8 being an access destination.

Further, when the access destination from the virtual machine 4 to the I/O device 8 is a BAR, and a read request for the BAR is issued, the request destination determination unit 32 holds the BDF number and the BAR number until setting of the BAR is completed. Further, when the setting request from the virtual machine 4 to the PCI configuration register is for the BAR, and a write request for the BAR is issued, the request destination determination unit 32 holds the write target data along with the BDF number and the BAR number as a set.

Next, a request control unit 53 provided in the I/O device manager 5 issues a configuration read/write request to the I/O device 8 in accordance with the notification from the virtual machine monitor 3 and performs setting of the I/O device 8 (Step S56d). The request control unit 53 accesses a MAC address table 55 by use of the identifier of the virtual machine and the BDF number, and obtains a MAC address of a request destination. Then, the request control unit 53 constructs an Ethernet frame including a TLP packet as a payload from the acquired MAC address, the access type included in the notification from the virtual machine monitor 3, and the BDF number of the I/O device 8 being an access destination. Then, the request control unit 53 transmits the constructed Ethernet frame to the I/O device 8.

The I/O device 8 receives the TLP packet (configuration read/write) decapsulated by an I/O side network interface 6 through the I/O side network interface 6. Then, the I/O device 8 processes the request, based on the TLP packet, and transmits a TLP packet for a completion to the I/O device manager 5 (Step S82d). The completion TLP packet is encapsulated into an Ethernet frame in the I/O side network interface 6 and then transmitted to the I/O device manager 5.

When receiving the completion from the I/O device 8, the I/O device manager 5 notifies the notification to the virtual machine monitor 3 (Step S58d). When the request from the virtual machine monitor 3 is a read request for the PCI configuration register, a read result is included in a payload part of the completion TLP packet, and therefore the I/O device manager 5 also notifies the read result to the virtual machine monitor 3.

When the setting request to the PCI configuration register from the virtual machine 4 is for the BAR and is particularly a read request for the BAR, the request destination determination unit 32 holds read data (e.g. a space size and a space type that are requested by the BAR) as a set along with the BAR number and the BDF number that are held in Step S36d in FIG. 17.

When the setting request to the PCI configuration register from the virtual machine 4 is for the BAR and is particularly a write request for the BAR (setting of a base address of the BAR), the setting of the BAR is completed when the completion notification is made. Accordingly, the request destination determination unit 32 registers in the address range table 35 a starting address (a value written into the BAR), an ending address (a value obtained by adding the value read from the BAR to the value written into the BAR), the BDF number, and the BAR number (Step S37d).

Then, the request destination determination unit 32 notifies the virtual machine 4 that the request to the PCI configuration register is completed (Step S38d).

Next, an operation when the virtual machine 4 issues a memory read/write request to an I/O device 8 will be described.

Figure 18:
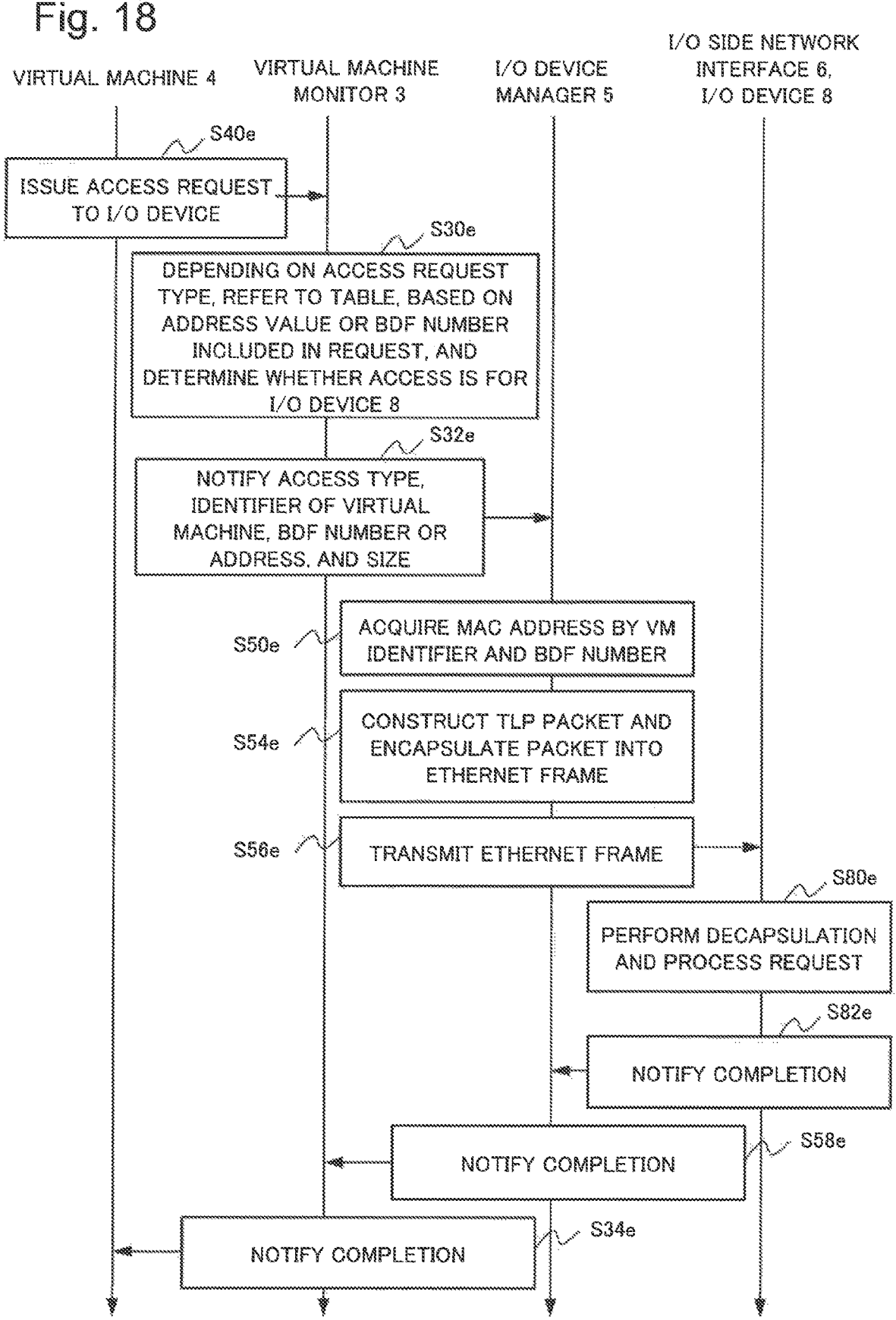
FIG. 18 is a sequence diagram illustrating a processing flow when a memory read/write request is issued from the virtual machine to the I/O device, according to the second example embodiment of the present invention.

FIG. 18 is a sequence diagram illustrating a processing flow when the virtual machine issues a memory read/write request to an I/O device, according to the second example embodiment of the present invention.

When the virtual machine 4 issues an access request to an I/O device 8 (Step S40e), the request destination determination unit 32 provided in the virtual machine monitor 3 refers to the address range table 35 by an address value (or refers to the BDF number table by a BDF number) depending on an identifier of the virtual machine and a type of the access request, and checks whether an entry exists in the table (Step S30e). When an entry exists, the request destination determination unit 32 determines that the access request is an access to the I/O device 8.

The request destination determination unit 32 notifies the I/O device manager 5 of the identifier of the virtual machine, the access type, the BDF number (or the address value), and a size of data to be accessed (Step S32e).

The request control unit 53 provided in the I/O device manager 5 refers to the MAC address table 55 and acquires a MAC address by use of the identifier of the virtual machine and the BDF number (Step S50e).

The request control unit 53 generates an Ethernet frame including a TLP packet as a payload, by use of the MAC address acquired in Step S50e in FIG. 18 and the information notified by the virtual machine monitor 3 (Step S54e).

The request control unit 53 transmits the Ethernet frame generated in Step S54e in FIG. 18 to the I/O device 8 (Step S56e).

When receiving the TLP packet decapsulated by the I/O side network interface 6 from the I/O side network interface 6, the I/O device 8 processes the request, based on the TLP packet (Step S80e).

When the request requires a completion TLP packet, the I/O device 8 transmits a completion TLP packet to the I/O device manager 5 (Step S82e). The TLP packet is encapsulated into an Ethernet frame in the I/O side network interface 6.

When receiving the completion notification from the I/O device 8, the I/O device manager 5 notifies the virtual machine monitor 3 that the completion notification is received, along with the identifier of the virtual machine 4 (Step S58e). The identifier of the virtual machine 4 is obtained by referring to a MAC address reverse lookup table 58 by use of a source MAC address of the received notification (the Ethernet frame including the completion TLP packet as a payload).

When receiving the completion notification from the I/O device manager 5, the virtual machine monitor 3 notifies that the access request to the I/O device 8 is completed to a virtual machine 4 with the identifier of the virtual machine 4 included in the notification (Step S34e).

Note that processing of a memory read/write request from an I/O device 8 to the virtual machine 4 is similar to the processing according to the first example embodiment described by reference to FIG. 12, and therefore detailed description thereof is omitted.

Next, an effect of the present example embodiment will be described.

The present example embodiment manages an I/O device 8 allocated to the virtual machine 4, in an independent BDF number space for each virtual machine 4. Since use of the independent BDF number space may be arbitrarily determined by the virtual machine 4, there is no need to perform conversion of a BDF number and calculation of an offset address value in the virtual machine monitor 3. Consequently, even when a large number of virtual machines 4 operate on one server, a required number of I/O devices 8 can be connected while simplifying the configuration of the virtual machine monitor 3.

Third Example Embodiment

Next, a third example embodiment of the present invention will be described in detail with reference to drawings. Note that a component similar to that according to the first and second example embodiments of the present invention is given a same reference sign, and detailed description thereof is omitted.

Figure 19:
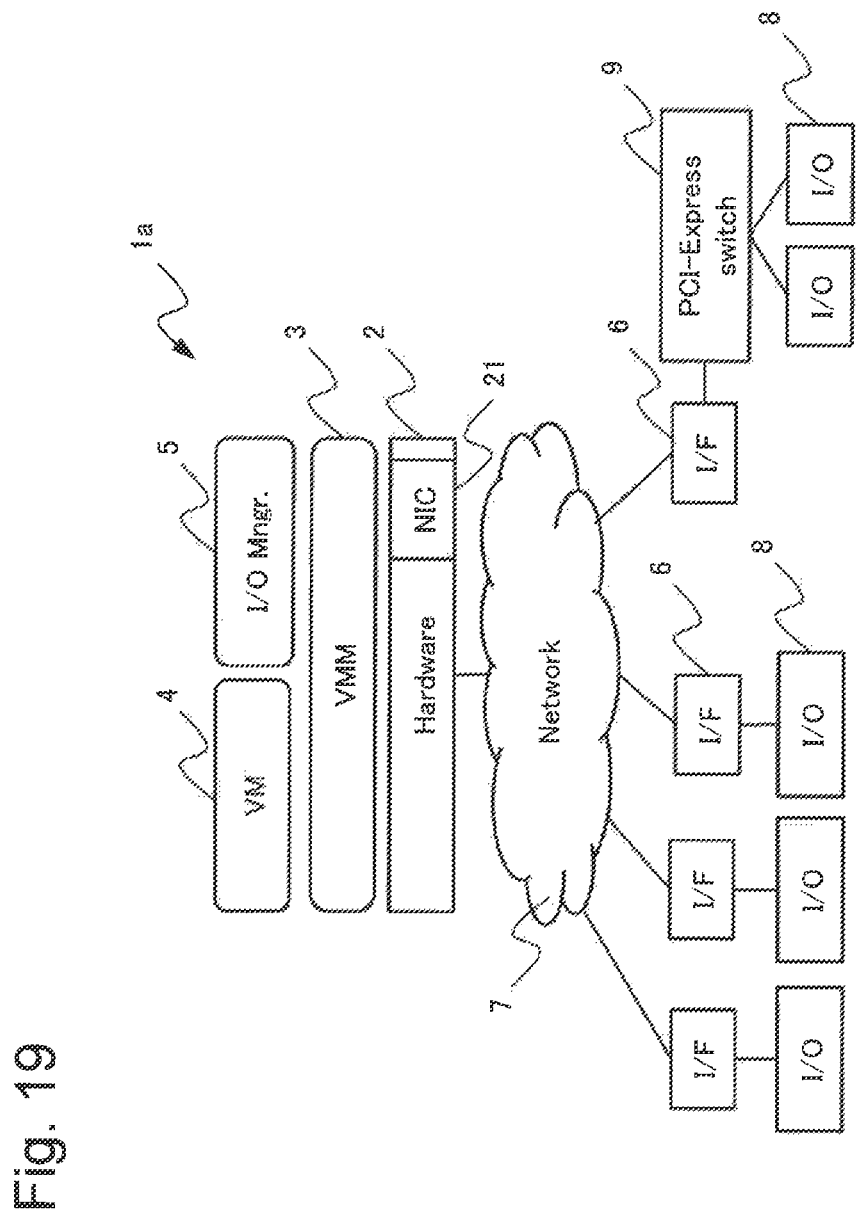
FIG. 19 is a block diagram illustrating a configuration example of a computer system according to a third example embodiment of the present invention.

FIG. 19 is a block diagram illustrating a configuration example of a computer system according to the third example embodiment of the present invention. Referring to FIG. 19, in a computer system 1a, an I/O side network interface 6 out of a plurality of I/O side network interfaces 6 is connected to a PCI-Express switch 9 instead of an I/O device 8, compared with the configuration illustrated in FIG. 1. Additionally, the PCI-Express switch 9 is connected to I/O devices 8.

The PCI-Express switch 9 is used when a plurality of I/O devices 8 are connected under an I/O side network interface 6. A BDF number is allocated to the PCI-Express switch 9 by an I/O device manager 5 also, similarly to the I/O device 8. Although FIG. 19 illustrates a case that two I/O devices 8 are connected to the PCI-Express switch 9, the number of I/O devices 8 is not limited to two.

As described above, the PCI-Express switch 9 has a function equivalent to a PCI-PCI bridge. Accordingly, a real PCI-PCI bridge and a virtual PCI-PCI bridge inserted depending on a number of I/O devices 8 allocated to a virtual machine 4 or the like exist in a PCI-Express fabric in the computer system 1a illustrated in FIG. 19.

Accordingly, in a case of executing processing of allocating an I/O device 8 to the virtual machine 4, according to the present example embodiment, when passing setting information to a virtual machine monitor 3 (corresponding to Step S54a in FIG. 10 in the first example embodiment), the I/O device manager 5 assigns a flag indicating a virtual device to an entry of a virtual PCI-PCI bridge in the setting information. Alternatively, when passing an I/O device list to the virtual machine monitor 3 (corresponding to Step S54d in FIG. 17 in the second example embodiment), the I/O device manager 5 assigns a flag indicating a virtual device to an entry of a virtual PCI-PCI bridge in the I/O device list.

When receiving an initialization signal from the virtual machine 4, the virtual machine monitor 3 refers to a flag assigned to setting information or an I/O device list, and when an initialization target is a virtual PCI-PCI bridge, does not notify the I/O device manager 5 of information at initialization of the I/O device 8 from the virtual machine 4. Further, when receiving an initialization signal from the virtual machine 4, the virtual machine monitor 3 refers to a flag assigned to setting information or an I/O device list, and when an initialization target is a real PCI-PCI bridge, notifies the I/O device manager 5 of information received from the virtual machine 4.

An I/O device 8 connected to the PCI-Express switch 9 is initialized after initialization of the PCI-Express switch 9 is completed. Specifically, in the case of the first example embodiment, an I/O device 8 is initialized by the I/O device allocation unit 33.

In the case of the second example embodiment, an I/O device 8 is initialized by the virtual machine 4. The above may be provided by a method similar to an operation at initialization of a standard PCI-Express fabric.

Next, an effect of the present example embodiment will be described.

The present example embodiment assigns a flag indicating a virtual device to a virtual PCI-PCI bridge used for causing the virtual machine 4 to recognize an I/O device 8 with a different bus number. Consequently, distinction between a virtual PCI-PCI bridge and a real PCI-PCI bridge is enabled, and even a system in which a PCI-Express switch 9 is connected beyond the I/O side network interface 6, and a plurality of I/O devices 8 are connected beyond the PCI-Express switch 9 can be supported.

Fourth Example Embodiment

Next, a fourth example embodiment of the present invention will be described in detail with reference to drawings. Note that a component similar to that according to the first to third example embodiments of the present invention is given a same reference sign, and detailed description thereof is omitted.

Figure 20:
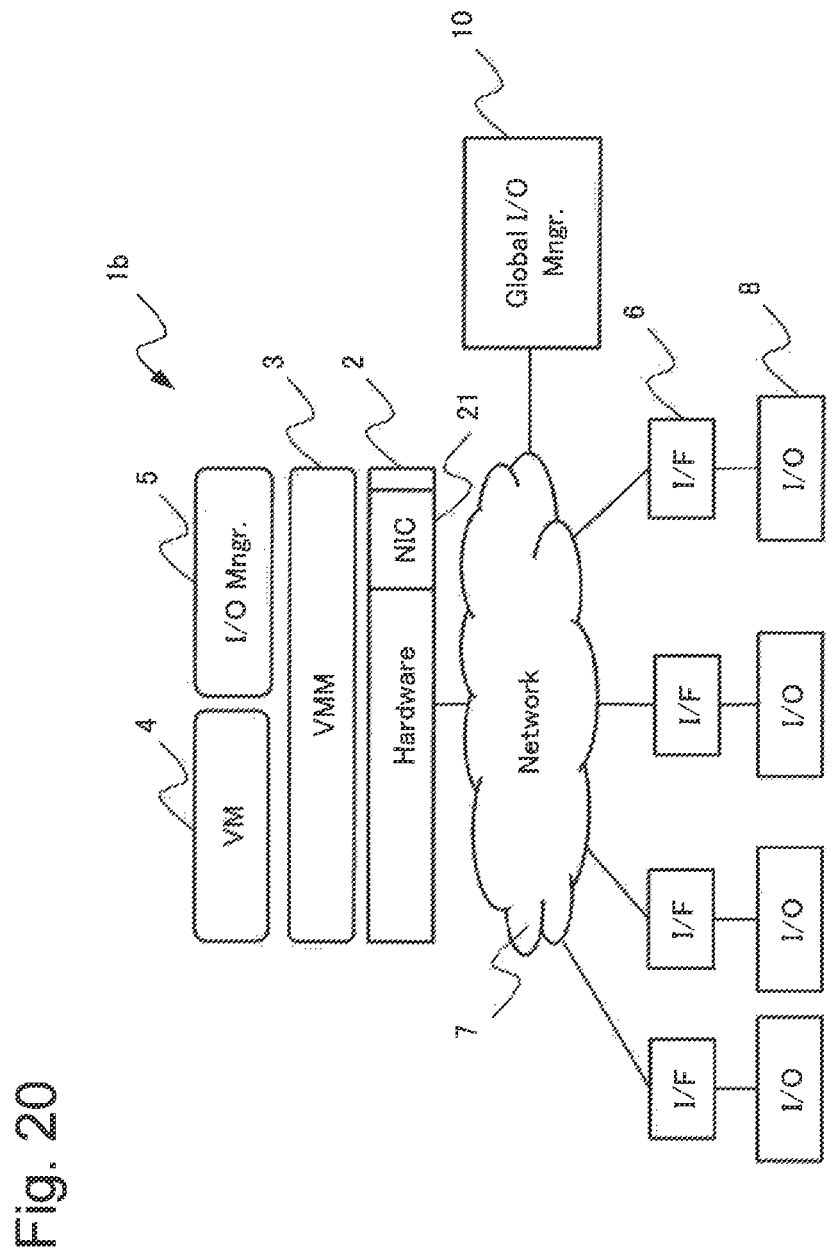
FIG. 20 is a block diagram illustrating a configuration example of a computer system according to a fourth example embodiment of the present invention.

FIG. 20 is a block diagram illustrating a configuration example of a computer system according to the fourth example embodiment of the present invention. Referring to FIG. 20, a computer system 1b has a configuration obtained by adding a global I/O device manager 10 to the configuration illustrated in FIG. 1.

The global I/O device manager 10 holds an I/O device list for managing a type and a specification of an I/O device 8, a MAC address of an I/O side network interface 6 connected to the I/O device 8, an identifier of a virtual machine monitor 3 being an allocation destination of the I/O device 8, and an identifier of a virtual machine 4 being an allocation destination of the I/O device 8. The global I/O device manager 10 performs a search for and allocation of an I/O device 8 in response to an allocation request for an I/O device 8 from every virtual machine monitor 3 operating on hardware 2 connected to a network 7 and notifies the information to an I/O device manager 5. The I/O device list will be described with reference to FIG. 22.

The global I/O device manager 10 illustrated in FIG. 20 will be described.

Figure 21:
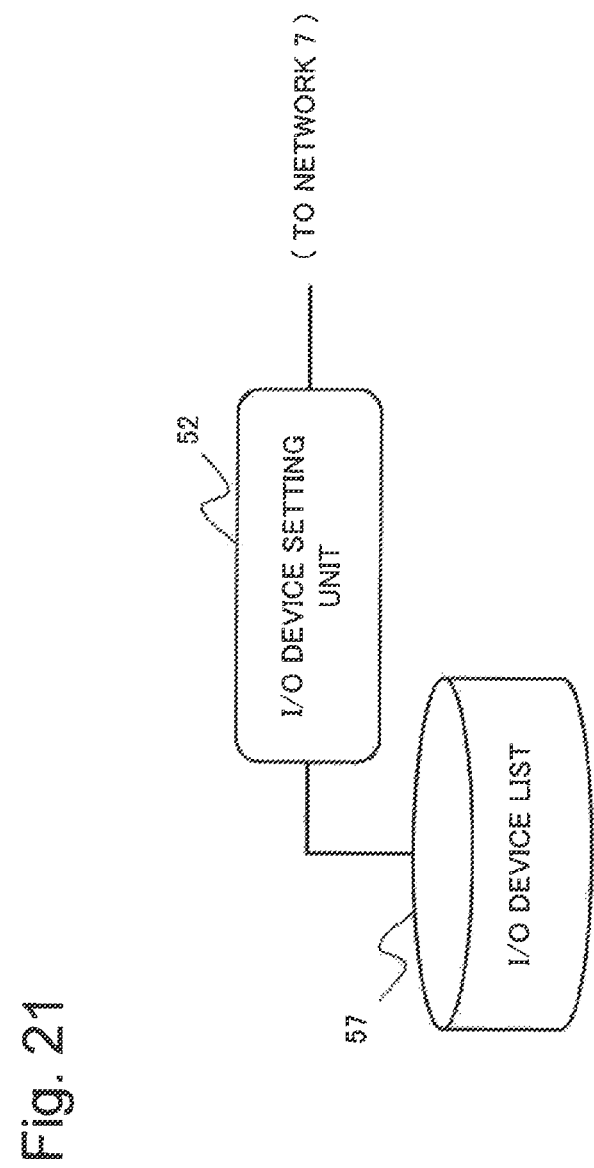
FIG. 21 is a block diagram illustrating a configuration example of a global I/O device manager according to the fourth example embodiment of the present invention.

FIG. 21 is a block diagram illustrating a configuration example of the global I/O device manager according to the fourth example embodiment of the present invention. Referring to FIG. 21, the global I/O device manager 10 includes an I/O device setting unit 52 and an I/O device list 57. The I/O device setting unit 52 is connected to the virtual machine monitor 3 and the I/O device manager 5 that are illustrated in FIG. 20 through the network 7.

The I/O device list 57 illustrated in FIG. 21 will be described.

FIG. 22 is a diagram illustrating a structure example of the I/O device list according to the fourth example embodiment of the present invention. The I/O device list 57 according to the present example embodiment manages a type and a specification of an I/O device 8, a MAC address of an I/O side network interface 6 connected to the I/O device 8, an identifier of a virtual machine monitor 3 being an allocation destination of the I/O device 8, and an identifier of a virtual machine 4 being an allocation destination of the I/O device 8.

The I/O device manager 5 illustrated in FIG. 20 will be described.

Figure 23:
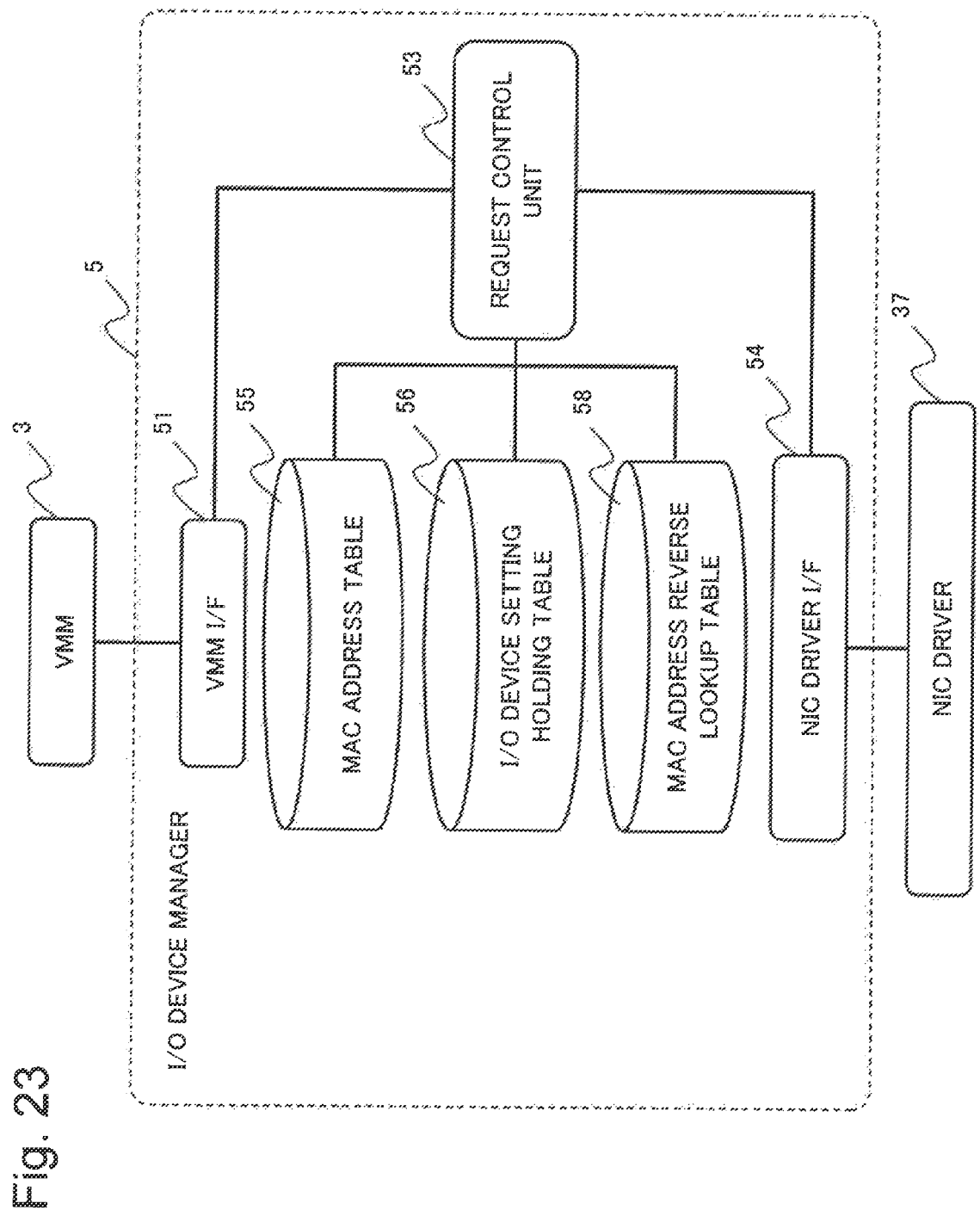
FIG. 23 is a block diagram illustrating a configuration example of an I/O device manager according to the fourth example embodiment of the present invention.
Figure 24:
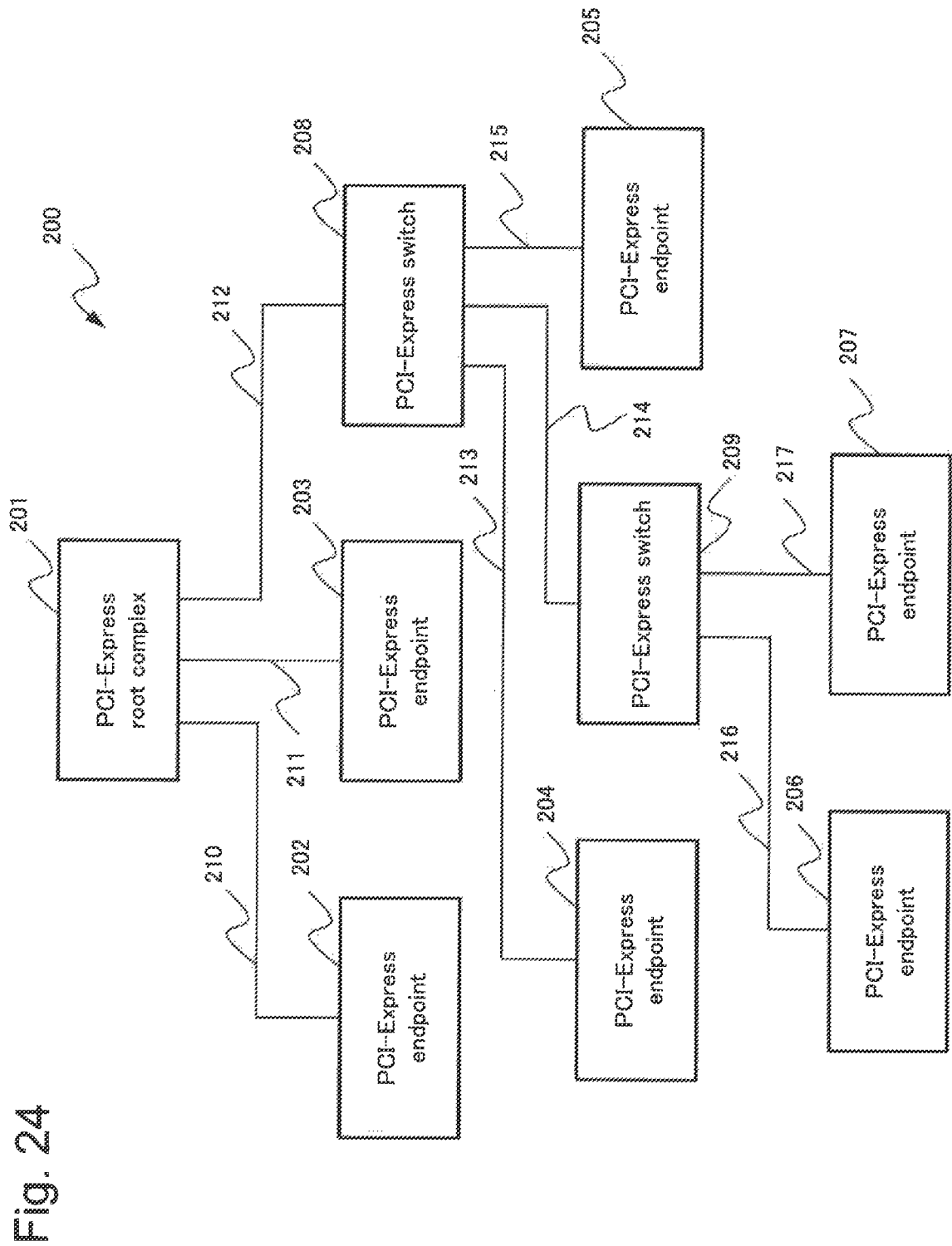
FIG. 24 is a diagram illustrating an example of a PCI-Express fabric.
Figure 25:
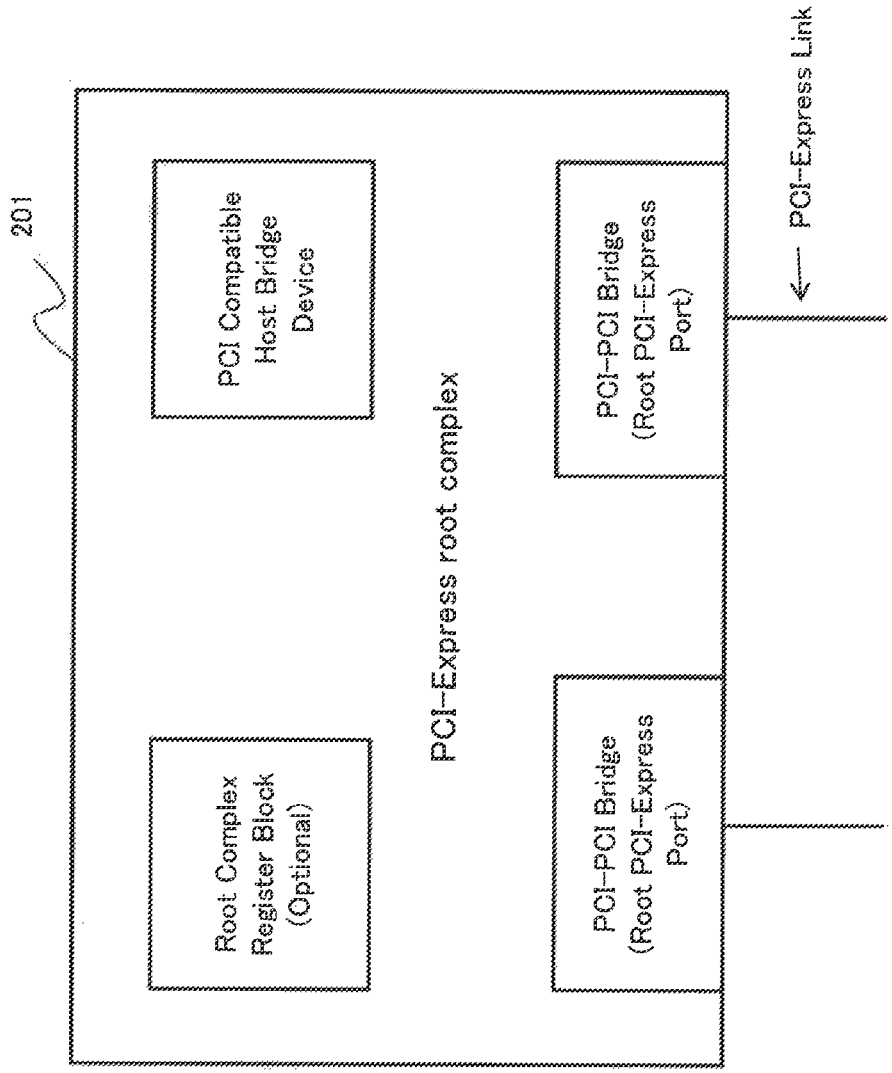
FIG. 25 is a simplified block diagram illustrating an internal configuration of the PCI-Express root complex illustrated in FIG. 24.
Figure 26:
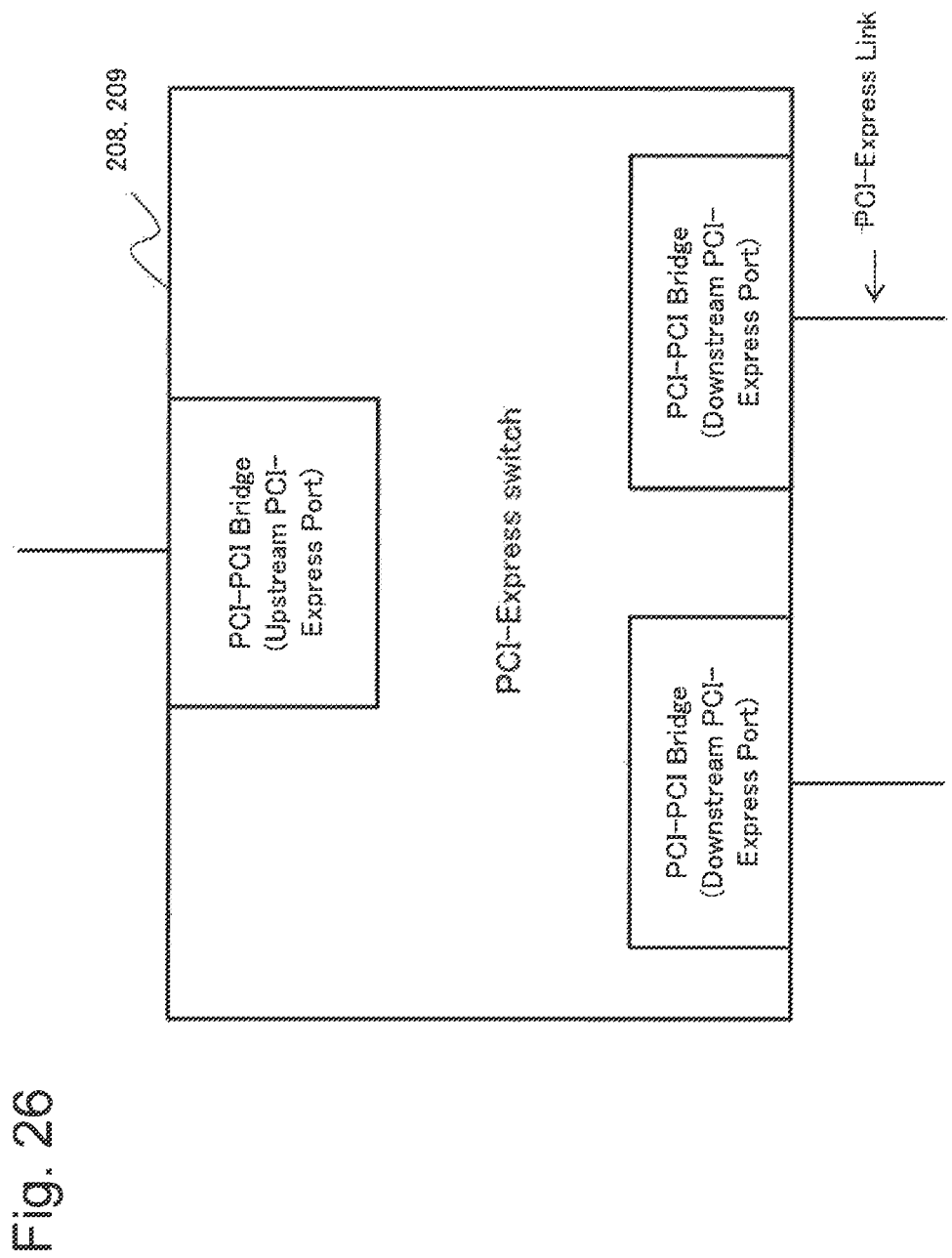
FIG. 26 is a simplified block diagram illustrating an internal configuration of the PCI-Express switch illustrated in FIG. 24.

FIG. 23 is a block diagram illustrating a configuration example of the I/O device manager according to the fourth example embodiment of the present invention. The I/O device manager 5 according to the present example embodiment has a configuration obtained by excluding the I/O device list 57 and the I/O device setting unit 52 from the configuration of the I/O device manager 5 described in the first example embodiment.

Next, an operation of the computer system according to the present example embodiment will be described.

When receiving an inquiry about I/O device availability (Step S30a in FIG. 10 and Step S30d in FIG. 17) from a virtual machine monitor 3, the I/O device setting unit 52 provided in the global I/O device manager 10 searches the I/O device list 57 (Step S50a in FIG. 10 and Step S50d in FIG. 17). Next, the I/O device setting unit 52 notifies information about an I/O device 8 satisfying a condition in a specification included in the inquiry to an I/O device manager 5 operating on the same hardware as the virtual machine monitor 3 being an inquiry source (notification only in Step S54a in FIG. 10 and Step S54d in FIG. 17). The inquiry includes an identifier of the virtual machine monitor 3 being the inquiry source, in addition to the information described in the first to third example embodiments.

The I/O device manager 5 initializes the I/O device (Steps S52*a* to S53*a* in FIG. 10) in accordance with the notification from the global I/O device manager 10. Further, a case that the global I/O device manager 10 directly makes a notification to the virtual machine monitor 3 may also be considered. In this case, the virtual machine monitor 3 registers the information about the I/O device 8, based on the notification from the global I/O device manager 10 (Step S31*d* in FIG. 17).

Next, an effect of the present example embodiment will be described.

The present example embodiment includes the global I/O device manager 10 centrally managing I/O devices 8. Consequently, an I/O device 8 can be allocated to a virtual machine 4 operating on each virtual machine monitor 3, even in the network 7 to which a plurality of pieces of hardware 2 are connected.

The computer according to the present example embodiment may also be configured as follows.

Supplementary Note 1

A computer including:

a storage unit that stores an I/O device list for managing allocation of an I/O device to a virtual machine operating on the computer, the I/O device being connected to the computer through a network;

a virtual machine monitor that specifies an I/O device required for operation of the virtual machine; and an I/O device manager that determines whether or not an I/O device specified by the virtual machine monitor is allocable to the virtual machine by referring to the I/O device list, and when an I/O device allocable to the virtual machine exists, allocates the I/O device to the virtual machine and, along with an identifier of the virtual machine, stores in the storage unit an identifier assigned to the I/O device in accordance with a predetermined specification.

Supplementary Note 2

The computer according to Supplementary Note 1, wherein the storage unit further includes an address table for managing a set of information composed of an identifier of the virtual machine, the identifier of the I/O device allocated to the virtual machine, and an interface identifier being an identifier of an interface connected between the I/O device and the network, the I/O device list holds a set of information including a type and a specification of the I/O device, the interface identifier of an interface connected to the I/O device, and an identifier of a virtual machine being an allocation destination of the I/O device, when determining that the I/O device is allocable to the virtual machine, the I/O device manager updates the I/O device list and the address table by use of an identifier of the virtual machine and the identifier of the I/O device, executes, before boot-up of the virtual machine, initialization of an I/O device allocated to the virtual machine, and notifies initialization information to the virtual machine monitor, and the virtual machine monitor holds initialization information of the I/O device, the information being notified from the I/O device manager, and when trapping a signal for initialization of the I/O device after booting up the virtual machine, the signal being transmitted from the virtual machine, responds to initialization processing by the virtual machine, based on held initialization information of the I/O device.

Supplementary Note 3

The computer according to Supplementary Note 2, wherein, with respect to the I/O device allocated to the virtual machine, the storage unit further includes a number correspondence table that holds information about a virtual identifier being an identifier assigned by the virtual machine and information about the identifier assigned by the I/O device manager, the pieces of information being associated with one another, and, when accepting an access request from the virtual machine to the I/O device, the virtual machine monitor reads the virtual identifier of the I/O device included in the access request, specifies in the number correspondence table the identifier corresponding to a read virtual identifier, and notifies the I/O device manager of the access request including information about the specified identifier.

Supplementary Note 4

The computer according to Supplementary Note 1, wherein the storage unit further includes:

an address table for managing a set of information composed of an identifier of the virtual machine, the identifier of the I/O device allocated to the virtual machine, and an interface identifier being an identifier of an interface connected between the I/O device and the network and a number table that holds the identifier of the I/O device allocated to the virtual machine, and wherein the I/O device list holds a set of information including a type and a specification of the I/O device, the interface identifier of an interface connected to the I/O device, and an identifier of a virtual machine being an allocation destination of the I/O device, the identifier of the I/O device is assigned by the virtual machine, when trapping a setting request signal from the virtual machine after booting up the virtual machine, the virtual machine monitor determines whether or not a target of the setting request is an I/O device registered in the number table, and when determining that a target of the setting request is an I/O device registered in the number table, notifies the I/O device manager of an identifier of the virtual machine and the identifier of the I/O device that are included in a trapped signal, and the I/O device manager reads an interface identifier specified in the address table by a notified identifier of the virtual machine and a notified identifier of the I/O device, and executes initialization on the I/O device through an interface with the interface identifier.

Supplementary Note 5

The computer according to Supplementary Note 3 or 4, wherein the storage unit further includes an address reverse lookup table that holds an interface identifier of the interface and an identifier of the virtual machine to which an I/O device connected to the interface is allocated, the identifiers being associated with one another, when accepting an access request or a setting request from the virtual machine to the I/O device through the virtual machine monitor, the I/O device manager constructs a packet in accordance with a specification of a fabric including the I/O device, by use of information included in the request, and transmits a frame encapsulating the packet in accordance with a specification of the network to the I/O device through the network and the interface, and, when receiving a frame from the I/O device through the interface and the network, the I/O device manager decapsulates a packet in the frame in accordance with a specification of the network, reads an interface identifier indicating a source from a decapsulated packet, refers to the address reverse lookup table, reads an identifier of the virtual machine registered correspondingly to the interface identifier, and transmits a packet to a virtual machine specified by the identifier.

Supplementary Note 6

The computer according to Supplementary Note 2 or 4, wherein the I/O device manager inserts information of a virtual device into the I/O device list in accordance with a specification of a fabric including the I/O device.

Supplementary Note 7

The computer according to Supplementary Note 6, wherein, when inserting information of the virtual device into the I/O device list, the I/O device manager assigns information indicating a virtual device to an entry of the virtual device, and even when receiving an initialization signal from the virtual machine, the virtual machine monitor does not notify information of a device assigned with information indicating the virtual device.

Supplementary Note 8

A computer system including:

a plurality of computers that include a virtual machine monitor specifying an I/O device required for operation of a virtual machine, the virtual machines different from one another operating on the computers, and a global I/O device manager that includes a storage unit that stores an I/O device list for managing allocation of an I/O device to the virtual machine, the I/O device being connected to the plurality of computers through a network and a device setting unit that searches the I/O device list for whether or not an I/O device specified by the virtual machine monitor is allocable to the virtual machine, and when an allocable I/O device exists, allocates the I/O device to the virtual machine, assigns an identifier to the I/O device in accordance with a predetermined specification, and stores the identifier of the I/O device in the I/O device list along with an identifier of the virtual machine monitor and an identifier of the virtual machine.

The device allocation management method according to the present example embodiment may be configured as follows.

Supplementary Note 9

A device allocation management method by a computer, the method including:

storing in a storage unit an I/O device list for managing allocation of an I/O device to a virtual machine operating on the computer, the I/O device being connected to the computer through a network;

specifying an I/O device required for operation of the virtual machine;

determining whether or not a specified I/O device is allocable to the virtual machine by referring to the I/O device list; and, when an I/O device allocable to the virtual machine exists, allocating the I/O device to the virtual machine and, along with an identifier of the virtual machine, storing in the storage unit an identifier assigned to the I/O device in accordance with a predetermined specification.

Supplementary Note 10

The device allocation management method according to Supplementary Note 9, wherein the I/O device list holds a set of information including a type and a specification of the I/O device, the interface identifier of an interface connected to the I/O device, and an identifier of a virtual machine being an allocation destination of the I/O device, the method further including:

storing in the storage unit an address table for managing a set of information composed of an identifier of the virtual machine, the identifier of the I/O device allocated to the virtual machine, and an interface identifier being an identifier of an interface connected between the I/O device and the network;

when determining that the I/O device is allocable to the virtual machine, updating the I/O device list and the address table by use of an identifier of the virtual machine and the identifier of the I/O device;

executing, before boot-up of the virtual machine, initialization of an I/O device allocated to the virtual machine and holding initialization information; and, when trapping a signal for initialization of the I/O device after booting up the virtual machine, the signal being transmitted from the virtual machine, responding to initialization processing by the virtual machine, based on held initialization information of the I/O device.

Supplementary Note 11

The device allocation management method according to Supplementary Note 10, further including:

with respect to the I/O device allocated to the virtual machine, storing in the storage unit a number correspondence table that holds information about a virtual identifier being an identifier assigned by the virtual machine and information about the identifier of the I/O device, the pieces of information being associated with one another; and, when accepting an access request from the virtual machine to the I/O device, reading the virtual identifier of the I/O device included in the access request and specifying in the number correspondence table the identifier corresponding to a read virtual identifier.

Supplementary Note 12

The device allocation management method according to Supplementary Note 9, wherein the I/O device list holds a set of information including a type and a specification of the I/O device, the interface identifier of an interface connected to the I/O device, and an identifier of a virtual machine being an allocation destination of the I/O device, and the identifier of the I/O device is assigned by the virtual machine, the method further including:

storing in the storage unit an address table for managing a set of information composed of an identifier of the virtual machine, the identifier of the I/O device allocated to the virtual machine, and an interface identifier being an identifier of an interface connected between the I/O device and the network and a number table that holds the identifier of the I/O device allocated to the virtual machine;

when trapping a setting request signal from the virtual machine after booting up the virtual machine, determining whether or not a target of the setting request is an I/O device registered in the number table;

when determining that a target of the setting request is an I/O device registered in the number table, reading an identifier of the virtual machine and the identifier of the I/O device that are included in a trapped signal;

specifying an interface identifier in the address table by a read identifier of the virtual machine and a read identifier of the I/O device; and executing initialization on the I/O device through an interface with a specified interface identifier.

The program according to the present example embodiment may be configured as follows.

Supplementary Note 13

A program for causing a computer to execute:

a procedure of storing in a storage unit an I/O device list for managing allocation of an I/O device to a virtual machine operating on the computer, the I/O device being connected to the computer through a network;

a procedure of specifying an I/O device required for operation of the virtual machine;

a procedure of determining whether or not a specified I/O device is allocable to the virtual machine, by referring to the I/O device list; and a procedure of allocating, when an I/O device allocable to the virtual machine exists, the I/O device to the virtual machine and, along with an identifier of the virtual machine, storing in the storage unit an identifier assigned to the I/O device in accordance with a predetermined specification.

Supplementary Note 14

The program according to Supplementary Note 13, wherein the I/O device list holds a set of information including a type and a specification of the I/O device, the interface identifier of an interface connected to the I/O device, and an identifier of a virtual machine being an allocation destination of the I/O device, the program further including:

a procedure of storing in the storage unit an address table for managing a set of information composed of an identifier of the virtual machine, the identifier of the I/O device allocated to the virtual machine, and an interface identifier being an identifier of an interface connected between the I/O device and the network;

a procedure of updating, when determining that the I/O device is allocable to the virtual machine, the I/O device list and the address table by use of an identifier of the virtual machine and the identifier of the I/O device;

a procedure of executing, before boot-up of the virtual machine, initialization of an I/O device allocated to the virtual machine and holding initialization information; and a procedure of responding to, when trapping a signal for initialization of the I/O device after booting up the virtual machine, the signal being transmitted from the virtual machine, initialization processing by the virtual machine, based on held initialization information of the I/O device.

Supplementary Note 15

The program according to Supplementary Note 14, further including:

a procedure of storing in the storage unit, with respect to the I/O device allocated to the virtual machine, a number correspondence table that holds information about a virtual identifier being an identifier assigned by the virtual machine and information about the identifier of the I/O device, the pieces of information being associated with one another; and a procedure of reading, when accepting an access request from the virtual machine to the I/O device, the virtual identifier of the I/O device included in the access request and specifying in the number correspondence table the identifier corresponding to a read virtual identifier.

Supplementary Note 16

The program according to Supplementary Note 13, wherein the I/O device list holds a set of information including a type and a specification of the I/O device, the interface identifier of an interface connected to the I/O device, and an identifier of a virtual machine being an allocation destination of the I/O device, and the identifier of the I/O device is assigned by the virtual machine, the program further including:

a procedure of storing in the storage unit an address table for managing a set of information composed of an identifier of the virtual machine, the identifier of the I/O device allocated to the virtual machine, and an interface identifier being an identifier of an interface connected between the I/O device and the network and a number table that holds the identifier of the I/O device allocated to the virtual machine;

a procedure of determining, when trapping a setting request signal from the virtual machine after booting up the virtual machine, whether or not a target of the setting request is an I/O device registered in the number table;

a procedure of reading, when determining that a target of the setting request is an I/O device registered in the number table, an identifier of the virtual machine and the identifier of the I/O device that are included in a trapped signal;

a procedure of specifying an interface identifier in the address table by a read identifier of the virtual machine and a read identifier of the I/O device; and a procedure of executing initialization on the I/O device through an interface with a specified interface identifier.

INDUSTRIAL APPLICABILITY

The present invention is applicable to a purpose of causing a large number of virtual machines to use a hardware function of an I/O device, in a computer system using a server virtualization technology.

This application claims priority based on Japanese Patent Application No. 2015-208114 filed on Oct. 22, 2015, the disclosure of which is hereby incorporated by reference thereto in its entirety.

REFERENCE SIGNS LIST 1, 1a, 1b Computer system
2 Hardware
3 Virtual machine monitor (VMM)
4 Virtual machine (VM)
5 I/O device manager
6 I/O side network interface
7 Network
8 I/O device
9 PCI-Express switch
10 Global I/O device manager
21 Network interface card (NIC)
31 Virtual machine interface
32 Request destination determination unit
33 I/O device allocation unit
34 I/O device manager interface
35 Address range table
36 BDF number correspondence table
36d BDF number table
37 NIC driver
38 Resource file holding unit
39 I/O device allocation list
51 Virtual machine monitor interface
52 I/O device setting unit
53 Request control unit
54 NIC driver interface
55 MAC address table
56 I/O device setting holding table
57 I/O device list
58 MAC address reverse lookup table
59 I/O device setting list

The invention claimed is:

1. A computer comprising:
  a storage that stores an I/O device list for managing allocation of an I/O device to a virtual machine operating on the computer, the I/O device being connected to the computer through a network; and
  at least one processor that specifies an I/O device required for operation of the virtual machine and determines whether or not an I/O device specified is allocable to the virtual machine, by referring to the I/O device list, and when an I/O device allocable to the virtual machine exists, allocates the I/O device to the virtual machine and, along with an identifier of the virtual machine, stores, in the storage, an identifier assigned to the I/O device in accordance with a predetermined specification, wherein
  the I/O device list holds a set of information including a type and a specification of the I/O device, an interface identifier of an interface connected between the I/O device and the network, and an identifier of a virtual machine being an allocation destination of the I/O device,
  the storage further stores an address table for managing a set of information composed of an identifier of the virtual machine, the identifier of the I/O device allocated to the virtual machine, and the interface identifier, and
  when determining that the I/O device is allocable to the virtual machine, the at least one processor updates the I/O device list and the address table by use of an identifier of the virtual machine and the identifier of the I/O device, executes, before boot-up of the virtual machine, initialization of an I/O device allocated to the virtual machine, and
  holds the initialization information of the I/O device, and when trapping a signal for initialization of the I/O device after booting up the virtual machine, the signal being transmitted from the virtual machine, responds to initialization processing by the virtual machine, based on the held initialization information of the I/O device.

2. A computer comprising:
  a storage that stores an I/O device list for managing allocation of an I/O device to a virtual machine operating on the computer, the I/O device being connected to the computer through a network; and
  at least one processor that specifies an I/O device required for operation of the virtual machine and determines whether or not an I/O device specified is allocable to the virtual machine, by referring to the I/O device list, and when an I/O device allocable to the virtual machine exists, allocates the I/O device to the virtual machine and, along with an identifier of the virtual machine, stores, in the storage, an identifier assigned to the I/O device in accordance with a predetermined specification, wherein
  the I/O device list holds a set of information including a type and a specification of the I/O device, an interface identifier of an interface connected between the I/O device and the network, and an identifier of a virtual machine being an allocation destination of the I/O device,
  the storage further stores:
    an address table for managing a set of information composed of an identifier of the virtual machine, the identifier of the I/O device allocated to the virtual machine, and the interface identifier, and
    a number table that holds the identifier of the I/O device allocated to the virtual machine,
  the identifier of the I/O device is assigned by the virtual machine,
  when trapping a setting request signal from the virtual machine after booting up the virtual machine, the at least one processor determines whether or not a target of the setting request signal is an I/O device registered in the number table, and when determining that a target of the setting request is an I/O device registered in the number table, and
  reads an interface identifier specified in the address table by a notified identifier of the virtual machine and a notified identifier of the I/O device, and executes initialization on the I/O device through an interface with the interface identifier.

3. A device allocation management method by a computer comprising:
  storing an I/O device list, in a storage, for managing allocation of an I/O device to a virtual machine operating on the computer, the I/O device list holding a set of information including a type and a specification of the I/O device, an interface identifier of an interface connected between the I/O device and the network, and an identifier of a virtual machine being an allocation destination of the I/O device, the I/O device being connected to the computer through a network;
  storing, in the storage, an address table for managing a set of information composed of an identifier of the virtual machine, the identifier of the I/O device allocated to the virtual machine, and the interface identifier;
  specifying an I/O device required for operation of the virtual machine;
  determining whether or not the I/O device specified is allocable to the virtual machine, by referring to the I/O device list, and when an I/O device allocable to the virtual machine exists, allocating the I/O device to the virtual machine and, along with an identifier of the virtual machine, storing, in the storage, an identifier assigned to the I/O device in accordance with a predetermined specification,
  when determining that the I/O device is allocable to the virtual machine, updating the I/O device list and the address table by use of an identifier of the virtual machine and the identifier of the I/O device;
  executing, before boot-up of the virtual machine, initialization of an I/O device allocated to the virtual machine and holding initialization information; and,
  when trapping a signal for the initialization of the I/O device after booting up the virtual machine, the signal being transmitted from the virtual machine, responding to initialization processing by the virtual machine, based on the held initialization information of the I/O device.

4. A device allocation management method by a computer comprising:
  storing an I/O device list, in a storage, for managing allocation of an I/O device to a virtual machine operating on the computer, the I/O device list holding a set of information including a type and a specification of the I/O device, an interface identifier of an interface connected between the I/O device and the network, and an identifier of a virtual machine being an allocation destination of the I/O device, the I/O device being connected to the computer through a network;
  storing, in the storage, an address table for managing a set of information composed of an identifier of the virtual machine, the identifier of the I/O device allocated to the virtual machine, and the interface identifier, and a number table that holds the identifier of the I/O device allocated to the virtual machine;

specifying an I/O device required for operation of the virtual machine;

determining whether or not the I/O device specified is allocable to the virtual machine, by referring to the I/O device list, and when an I/O device allocable to the virtual machine exists, allocating the I/O device to the virtual machine and, along with an identifier of the virtual machine, storing, in the storage, an identifier assigned to the I/O device by the virtual machine in accordance with a predetermined specification;

when trapping a setting request signal from the virtual machine after booting up the virtual machine, determining whether or not a target of the setting request signal is an I/O device registered in the number table;

when determining that a target of the setting request is an I/O device registered in the number table, reading an identifier of the virtual machine and the identifier of the I/O device that are included in a trapped signal;

specifying an interface identifier in the address table by a read identifier of the virtual machine and a read identifier of the I/O device; and executing initialization on the I/O device through an interface with a specified interface identifier.

* * * * *